United States Patent
Choi et al.

(10) Patent No.: US 11,888,626 B2
(45) Date of Patent: Jan. 30, 2024

(54) METHOD FOR GENERATING HARQ-ACK CODEBOOK IN WIRELESS COMMUNICATION SYSTEM AND DEVICE USING SAME

(71) Applicant: WILUS INSTITUTE OF STANDARDS AND TECHNOLOGY INC., Gyeonggi-do (KR)

(72) Inventors: Kyungjun Choi, Gyeonggi-do (KR); Minseok Noh, Seoul (KR); Jinsam Kwak, Gyeonggi-do (KR)

(73) Assignee: WILUS INSTITUTE OF STANDARDS AND TECHNOLOGY INC., Gyeonggi-Do (KR)

( * ) Notice: Subject to any disclaimer, the term of this patent is extended or adjusted under 35 U.S.C. 154(b) by 104 days.

(21) Appl. No.: 17/566,689

(22) Filed: Dec. 31, 2021

(65) Prior Publication Data
US 2022/0123874 A1   Apr. 21, 2022

Related U.S. Application Data

(63) Continuation of application No. 17/316,726, filed on May 11, 2021, now Pat. No. 11,290,218, which is a
(Continued)

(30) Foreign Application Priority Data

Nov. 11, 2018  (KR) .................. 10-2018-0137750
Nov. 14, 2018  (KR) .................. 10-2018-0140051
Oct. 2, 2019   (KR) .................. 10-2019-0122632

(51) Int. Cl.
*H04L 1/1812* (2023.01)
*H04L 1/1867* (2023.01)
(Continued)

(52) U.S. Cl.
CPC .......... *H04L 1/1819* (2013.01); *H04L 1/1896* (2013.01); *H04W 72/0446* (2013.01);
(Continued)

(58) Field of Classification Search
CPC ... H04L 1/1819; H04L 1/1896; H04L 1/1812; H04W 72/23; H04W 72/0446; H04W 72/0453; H04W 72/1273; H04W 72/1268
See application file for complete search history.

(56) References Cited

U.S. PATENT DOCUMENTS

2013/0242816 A1   9/2013  He et al.
2019/0149275 A1   5/2019  He et al.
(Continued)

FOREIGN PATENT DOCUMENTS

CN   103210604   7/2013
CN   106357374   1/2017
(Continued)

OTHER PUBLICATIONS

Extended European Search Report dated Mar. 14, 2022 for European Patent Application No. 19881297.6.
(Continued)

*Primary Examiner* — Ian N Moore
*Assistant Examiner* — Brian T Le
(74) *Attorney, Agent, or Firm* — Ladas & Parry, LLP

(57) ABSTRACT

Disclosed is a base station in a wireless communication system. Each base station in wireless communication comprises: a communication module; and a processor. The processor generates a hybrid automatic repeat request (HARQ)-ACK codebook comprising one or more bits and indicating whether or not reception of a channel or signal is successful, and transmits the HARQ-ACK codebook to the base station.

16 Claims, 18 Drawing Sheets

Related U.S. Application Data continuation of application No. PCT/KR2019/015292, filed on Nov. 11, 2019.

(51) Int. Cl.
   *H04W 72/0446* (2023.01)
   *H04W 72/0453* (2023.01)
   *H04W 72/1273* (2023.01)
   *H04W 72/23* (2023.01)

(52) U.S. Cl.
   CPC ... *H04W 72/0453* (2013.01); *H04W 72/1273* (2013.01); *H04W 72/23* (2023.01)

(56) References Cited

U.S. PATENT DOCUMENTS

| | | | |
|---|---|---|---|
| 2020/0036480 | A1 | 1/2020 | Yang et al. |
| 2020/0162207 | A1 | 5/2020 | Hwang et al. |
| 2020/0213044 | A1 | 7/2020 | Peng et al. |
| 2021/0006378 | A1* | 1/2021 | Lei .................. H04L 5/0055 |
| 2021/0153204 | A1* | 5/2021 | Takeda ............. H04W 72/23 |
| 2021/0344455 | A1 | 11/2021 | Choi et al. |
| 2022/0190967 | A1 | 6/2022 | Choi et al. |

FOREIGN PATENT DOCUMENTS

| | | |
|---|---|---|
| CN | 107925445 | 4/2018 |
| EP | 3 319 260 | 5/2018 |
| EP | 3 324 565 | 5/2018 |
| JP | 2018-528727 | 9/2018 |
| WO | 2017/028005 | 2/2017 |
| WO | 2018/167959 | 9/2018 |
| WO | 2018/194436 | 10/2018 |
| WO | 2018/203612 | 11/2018 |
| WO | 2019/107239 | 6/2019 |
| WO | 2020/096438 | 5/2020 |

OTHER PUBLICATIONS

Office Action dated May 26, 2022 for Indian Patent Application No. 202127022759.
Oral Proceedings dated Mar. 6, 2023 for European Patent Application No. 19881297.6.
Notice of Allowance dated Aug. 1, 2022 for Japanese Patent Application No. 2021-525636 and its English Translation provided by the Applicant's foreign counsel.
Office Action dated Aug. 2, 2022 for European Patent Application No. 19 881 297.6.
Notice of Allowance dated Oct. 20, 2022 for Korean Patent Application No. 10-2021-7013942 and its English Translation provided by the Applicant's foreign counsel.
International Search Report for PCT/KR2019/015292 dated Feb. 19, 2020 and its English translation from WIPO (now published as WO 2020/096438).
Written Opinion of the International Searching Authority for PCT/KR2019/015292 dated Feb. 19, 2020 and its English translation by Google Translate (now published as WO 2020/096438).
ERICSSON: "Other aspects on carrier aggregation." R1-1807262, 3GPP TSG-RAN WG1 Meeting #93. Busan, Korea, May 12, 2018. pp. 3-12.
Wilus Inc.: "Remaining Issues on HARQ-ACK Transmission on CA." R1-1809323, 3GPP TSG RAN WG1 Meeting #94. Gothenburg, Sweden, Aug. 11, 2018. pp. 1-2.
NTT DOCOMO, INC.: "Maintenance for carrier aggregation and bandwidth parts." R1-1809144, 3GPP TSG RAN WG1 Meeting #94. Gothenburg, Sweden, Aug. 11, 2018. See p. 4.
CATT: "Corrections on carrier aggregation and bandwidth part operation." R1-1808381, 3GPP TSG RAN WG1 Meeting #94. Gothenburg, Sweden, Aug. 11, 2018. See pp. 8-9.
Office Action dated Sep. 28, 2021 for U.S. Appl. No. 17/316,726 (now published as U.S. 2021/0344455).
Partial supplementary European Search Report dated Dec. 8, 2021 for European Patent Application No. 19881297.6.
ZTE: "Remaining issues on NR PUCCH", 3GPP TSG RAN WG1 Meeting #94bis, R1-1810340, Chengdu, China, Oct. 8-12, 2018, see pp. 1-8.
NTT DOCOMO, INC.: "PUCCH structure in short-duration", 3GPP TSG RAN WG1 Meeting #93, R1-1807061, Busan, Korea. May 21-25, 2018, see pp. 1-5.
InterDigital, Inc.: "Potential UCI enhancements for URLLC", 3GPP TSG RAN WG1 Meeting #95, R1-1813163, Spokane, USA, Nov. 12-16, 2018, see pp. 1-3.
Notice of Allowance dated Jan. 21, 2022 for U.S. Appl. No. 17/316,726.
Corrected Notice of Allowance dated Feb. 9, 2022 for U.S. Appl. No. 17/316,726.
Office Action dated Apr. 11, 2022 for Japanese Patent Application No. 2021-525636 and its English translation provided by Applicant's foreign counsel.
Office Action dated Jun. 14, 2022 for Korean Patent Application No. 10-2021-7013942 and its English translation provided by Applicant's foreign counsel.
Intel Corporation: "Remaining issues for carrier aggregation and bandwidth parts", 3GPP TSG-RAN WG1 Meeting #95, R1-1812473, Spokane, USA, Nov. 12-16, 2018, pp. 1-3.
Office Action dated Dec. 2, 2022 for Indian Patent Application No. 202228041830.
Office Action dated Jul. 31, 2023 for Japanese Patent Application No. 2022-110507 and its English translation provided by Applicant's foreign counsel.
ZTE: "Remaining issues on NR PUCCH", 3GPP TSG RAN WG1 Meeting #95, R1- 1812381, Spokane, USA, Nov. 3, 2018, pp. 1-4.
Office Action dated Aug. 7, 2023 for Japanese Patent Application No. 2022-110508 and its English translation provided by Applicant's foreign counsel.
Notice of Allowance dated Sep. 22, 2023 for U.S. Appl. No. 17/686,822.
Notice of Allowance dated Sep. 25, 2023 for U.S. Appl. No. 17/847,547.
Oral Proceedings Brief Communication dated Oct. 19, 2023 for European Patent Application No. 19 881 297.6.
Office Action dated Nov. 10, 2023 for Chinese Patent Application No. 201980082979.2 and its English translation provided by Applicant's foreign counsel.
Samsung: "HARQ-ACK Payload for PUCCH Format 3 in TDD Systems", 3GPP TSG RAN WG1 #64, R1-110722, Taipei, Taiwan, Feb. 15, 2011, pp. 1-4.

* cited by examiner

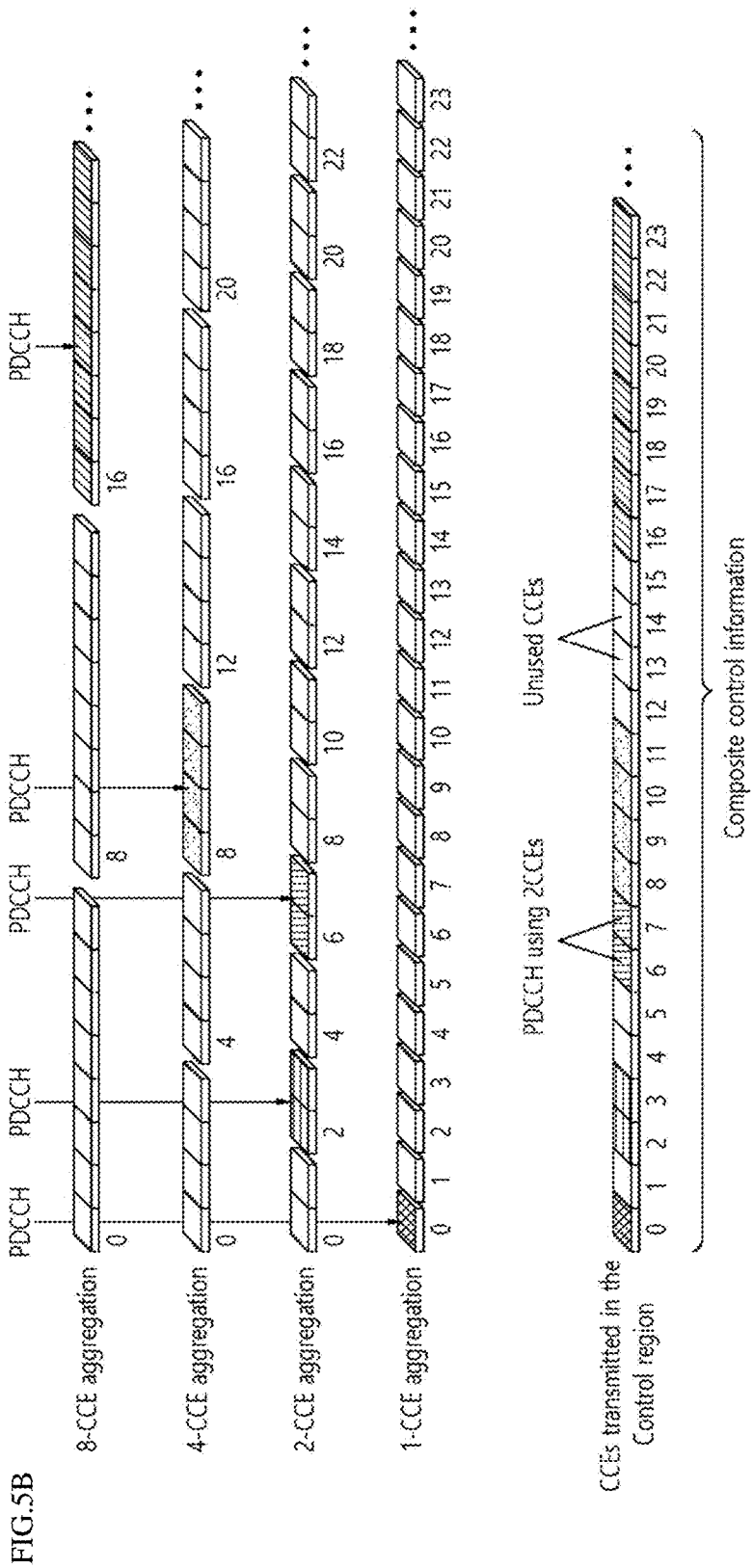

METHOD FOR GENERATING HARQ-ACK CODEBOOK IN WIRELESS COMMUNICATION SYSTEM AND DEVICE USING SAME

CROSS-REFERENCE TO RELATED APPLICATIONS

The present application is a continuation of U.S. patent application Ser. No. 17/316,726 filed on May 11, 2021, issued as U.S. Pat. No. 11,290,218 dated Mar. 29, 2022, which is a continuation of International Patent Application No. PCT/KR2019/015292 filed on Nov. 11, 2019, which claims the priority to Korean Patent Application No. 10-2018-0137750 filed in the Korean Intellectual Office on Nov. 11, 2018, Korean Patent Application No. 10-2018-0140051 filed in the Korean Intellectual Office on Nov. 14, 2018 and Korean Patent Application No. 10-2019-0122632 filed in the Korean Intellectual Office on Oct. 2, 2019, the entire contents of which are incorporated herein by reference.

TECHNICAL FIELD

The present disclosure relates to a wireless communication system. Specifically, the present disclosure relates to a method for generating a HARQ-ACK codebook in a wireless communication system, and a device using the same.

BACKGROUND ART

After commercialization of 4th generation (4G) communication system, in order to meet the increasing demand for wireless data traffic, efforts are being made to develop new 5th generation (5G) communication systems. The 5G communication system is called as a beyond 4G network communication system, a post LTE system, or a new radio (NR) system. In order to achieve a high data transfer rate, 5G communication systems include systems operated using the millimeter wave (mmWave) band of 6 GHz or more, and include a communication system operated using a frequency band of 6 GHz or less in terms of ensuring coverage so that implementations in base stations and terminals are under consideration.

A 3rd generation partnership project (3GPP) NR system enhances spectral efficiency of a network and enables a communication provider to provide more data and voice services over a given bandwidth. Accordingly, the 3GPP NR system is designed to meet the demands for high-speed data and media transmission in addition to supports for large volumes of voice. The advantages of the NR system are to have a higher throughput and a lower latency in an identical platform, support for frequency division duplex (FDD) and time division duplex (TDD), and a low operation cost with an enhanced end-user environment and a simple architecture.

For more efficient data processing, dynamic TDD of the NR system may use a method for varying the number of orthogonal frequency division multiplexing (OFDM) symbols that may be used in an uplink and downlink according to data traffic directions of cell users. For example, when the downlink traffic of the cell is larger than the uplink traffic, the base station may allocate a plurality of downlink OFDM symbols to a slot (or subframe). Information about the slot configuration should be transmitted to the terminals.

In order to alleviate the path loss of radio waves and increase the transmission distance of radio waves in the mmWave band, in 5G communication systems, beamforming, massive multiple input/output (massive MIMO), full dimensional MIMO (FD-MIMO), array antenna, analog beam-forming, hybrid beamforming that combines analog beamforming and digital beamforming, and large scale antenna technologies are discussed. In addition, for network improvement of the system, in the 5G communication system, technology developments related to evolved small cells, advanced small cells, cloud radio access network (cloud RAN), ultra-dense network, device to device communication (D2D), vehicle to everything communication (V2X), wireless backhaul, non-terrestrial network communication (NTN), moving network, cooperative communication, coordinated multi-points (CoMP), interference cancellation, and the like are being made. In addition, in the 5G system, hybrid FSK and QAM modulation (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced connectivity technologies, are being developed.

Meanwhile, in a human-centric connection network where humans generate and consume information, the Internet has evolved into the Internet of Things (IoT) network, which exchanges information among distributed components such as objects. Internet of Everything (IoE) technology, which combines IoT technology with big data processing technology through connection with cloud servers, is also emerging. In order to implement IoT, technology elements such as sensing technology, wired/wireless communication and network infrastructure, service interface technology, and security technology are required, so that in recent years, technologies such as sensor network, machine to machine (M2M), and machine type communication (MTC) have been studied for connection between objects. In the IoT environment, an intelligent internet technology (IT) service that collects and analyzes data generated from connected objects to create new value in human life can be provided. Through the fusion and mixture of existing information technology (IT) and various industries, IoT can be applied to fields such as smart home, smart building, smart city, smart car or connected car, smart grid, healthcare, smart home appliance, and advanced medical service.

Accordingly, various attempts have been made to apply the 5G communication system to the IoT network. For example, technologies such as a sensor network, a machine to machine (M2M), and a machine type communication (MTC) are implemented by techniques such as beamforming, MIMO, and array antennas. The application of the cloud RAN as the big data processing technology described above is an example of the fusion of 5G technology and IoT technology. Generally, a mobile communication system has been developed to provide voice service while ensuring the user's activity.

However, the mobile communication system is gradually expanding not only the voice but also the data service, and now it has developed to the extent of providing high-speed data service. However, in a mobile communication system in which services are currently being provided, a more advanced mobile communication system is required due to a shortage phenomenon of resources and a high-speed service demand of users.

DETAILED DESCRIPTION OF THE INVENTION

Technical Problem

In one aspect, an embodiment of the present disclosure provides a method for efficiently generating a HARQ-ACK codebook in a wireless communication system, and a device therefor.

Technical Solution

A user equipment in a wireless communication system according to an embodiment of the present disclosure includes: a communication module; and a processor configured to control the communication module. The processor is configured to: generate a hybrid automatic repeat request (HARQ)-ACK codebook including one or mode bits indicating whether a channel or signal is successfully received, and transmit the HARQ-ACK codebook to a base station.

The HARQ-ACK codebook may be a dynamic HARQ-ACK codebook in which the number of bits of the HARQ-ACK codebook is determined based on information signaled by a physical downlink control channel (PDCCH). The processor may transmit the HARQ-ACK codebook via a physical uplink control channel (PDCCH) transmitted in a resource indicated by the last PDCCH. The last PDCCH may be a PDCCH last received by the user equipment among a signal indicating whether reception is successful or not or a PDCCH scheduling a channel through the HARQ-ACK codebook.

The processor may determine a PDCCH corresponding to the last PDCCH among the plurality of PDDCHs, based on a symbol on which each of the plurality of PDCCHs is received. When it is not possible to determine a PDCCH corresponding to the last PDCCH among the plurality of PDDCHs, based on a symbol on which each of the plurality of PDCCHs is received, the processor may determine the PDCCH corresponding to the last PDCCH among the plurality of PDDCHs, based on a cell index of a cell in which each of the plurality of PDCCHs is received.

When it is not possible to determine the PDCCH corresponding to the last PDCCH among the plurality of PDDCHs, based on a symbol at which each of the plurality of PDCCHs is received and a cell index of a cell where each of the plurality of PDCCHs is received, the processor may determine the PDCCH corresponding to the last PDCCH among the plurality of PDDCHs, based on an index of a physical resource block (PRB) to which each of the plurality of PDCCHs is mapped.

When it is not possible to determine a PDCCH corresponding to the last PDCCH among the plurality of PDDCHs, based on a symbol at which each of the plurality of PDCCHs is received and a cell index of a cell where each of the plurality of PDCCHs is received, the processor may determine the PDCCH corresponding to the last PDCCH among the plurality of PDDCHs, based on an index of a control resource set (CORESET) to which each of the plurality of PDCCHs is mapped.

The processor may determine the PDCCH corresponding to the last PDCCH among the plurality of PDDCHs, based on a symbol on which each of the plurality of PDCCHs is received. When the start symbols of the plurality of PDCCHs are the same and the last symbols of the plurality of PDCCHs are the same, the resources for PUCCH transmission indicated by the plurality of PDCCHs may be the same.

The HARQ_ACK codebook may be a semi-static HARQ_ACK codebook configured to indicate which channel or signal is successfully received by the number of bits of the HARQ-ACK codebook and each bit of the HARQ-ACK codebook, based on radio resource control (RRC) signaling. When the user equipment receives an SPS PDSCH release PDCCH for releasing a semi-persistent scheduling (SPS) physical downlink shared channel (PDSCH) configured for the user equipment, the processor may insert a bit indicating HARQ-ACK for the SPS PDSCH release PDCCH instead of a bit indicating HARQ-ACK for the SPS PDSCH released by the SPS PDSCH release physical downlink shared channel (PDCCH) in the HARQ-ACK codebook.

When the SPS PDSCH release PDCCH releases a plurality of SPS PDSCH reception configurations configured for the user equipment, the processor may insert a bit indicating HARQ-ACK for the SPS PDSCH release PDCCH in the HARQ-ACK codebook instead of a bit indicating HARQ-ACK for the SPS PDSCH of one of the plurality of SPS PDSCH reception configurations.

When the SPS PDSCH release PDCCH releases a plurality of SPS PDSCH reception configurations configured for the user equipment, the processor may insert a bit indicating HARQ-ACK for the SPS PDSCH release PDCCH in the HARQ-ACK codebook instead of a bit indicating HARQ-ACK for each SPS PDSCH in the plurality of SPS PDSCH reception configurations.

The HARQ-ACK codebook may be a semi-static HARQ-ACK codebook that is configured based on radio resource control (RRC) signaling in which the number of bits of the HARQ-ACK codebook and each bit of the HARQ-ACK codebook indicate which channel or signal reception is successful. When the user equipment receives an SPS PDSCH release PDCCH for releasing a semi-persistent scheduling (SPS) physical downlink shared channel (PDSCH) configured for the user equipment, the processor may insert a bit indicating HARQ-ACK for the SPS PDSCH release PDCCH in a corresponding bit in the HARQ-ACK for transmission in a resource indicated by a time-domain resource assignment (TDRA) field of the SPS PDSCH release PDCCH in the HARQ-ACK codebook.

The processor may expect that the base station does not schedule a channel or signal to which HARQ-ACK is to be transmitted through the HARQ-ACK codebook in the resource indicated by the TDRA field of the SPS PDSCH release PDCCH.

The HARQ-ACK codebook may be a dynamic HARQ-ACK codebook in which the number of bits of the HARQ-ACK codebook is determined based on information signaled by a physical downlink control channel (PDCCH). When the user equipment receives the SPS PDSCH of a semi-persistent scheduling (SPS) physical downlink shared channel (PDSCH) configured for the user equipment, the processor may add 1 bit indicating HARQ-ACK for the SPS PDSCH to the HARQ-ACK codebook.

When the user equipment is configured to receive a plurality of SPS PDSCHs, the processor may determine the location of the HARQ-ACK for each SPS PDSCH in the HARQ-ACK codebook, based on the indexes of each of the plurality of SPS PDSCH reception configurations. Each of the plurality of SPS PDSCH release PDCCHs corresponds to each of the plurality of SPS PDSCH reception configurations.

When a plurality of SPS PDSCH reception configurations are configured in the user equipment, the processor may determine the location of the HARQ-ACK for each SPS PDSCH in the plurality of SPS PDSCH reception configurations, based on the index of each of the plurality of SPS PDSCH reception configurations and the time resource in which each SPS PDSCH is transmitted in the plurality of SPS PDSCH reception configurations, in the HARQ-ACK codebook.

When a plurality of SPS PDSCH reception configurations are configured in the user equipment, the processor may determine the location of the HARQ-ACK for the SPS PDSCH of each of the plurality of SPS PDSCH reception configurations in the HARQ-ACK codebook, based on the HARQ process number of each of the plurality of SPS PDSCH reception configurations.

The HARQ-ACK codebook may be a dynamic HARQ-ACK codebook in which the number of bits of the HARQ-ACK codebook is determined based on information signaled by a physical downlink control channel (PDCCH). When a resource scheduled for a semi-persistent scheduling (SPS) physical downlink shared channel (PDSCH) configured for the user equipment and a resource scheduled for a PDSCH scheduled by the PDCCH overlap, the processor may insert a bit indicating HARQ-ACK for a PDSCH scheduled by the PDCCH in the HARQ-ACK codebook instead of a bit indicating HARQ-ACK for the SPS PDSCH.

When a resource in which a plurality of SPS PDSCHs scheduled for the user equipment are scheduled and a resource in which a PDSCH scheduled by the PDCCH is scheduled overlap, the processor may insert a bit indicating HARQ-ACK for the PDSCH scheduled by the PDCCH in the HARQ-ACK codebook instead of a bit indicating HARQ-ACK for one of the plurality of SPS PDSCHs.

One of the plurality of SPS PDSCHs may be determined based on a time frequency resource through which each of the plurality of SPS PDSCHs is transmitted.

One of the plurality of SPS PDSCHs may be determined based on the index of each of the plurality of SPS PDSCHs.

One of the plurality of SPS PDSCHs may be determined based on a HARQ process number corresponding to each of the plurality of SPS PDSCHs.

Advantageous Effects

An embodiment of the present disclosure provides a method for efficiently receiving a physical control channel in a wireless communication system, and a device using the same.

Advantageous effects obtainable from the present disclosure are not limited to the above-mentioned advantageous effects, and other advantageous effects not mentioned herein will be clearly understood from the following description by those skilled in the art to which the present disclosure pertains.

BRIEF DESCRIPTION OF THE DRAWINGS

FIGS. 5A and 5B illustrate a procedure for transmitting control information and a control channel in a 3GPP NR system;

MODE FOR CARRYING OUT THE INVENTION

Figure 1:
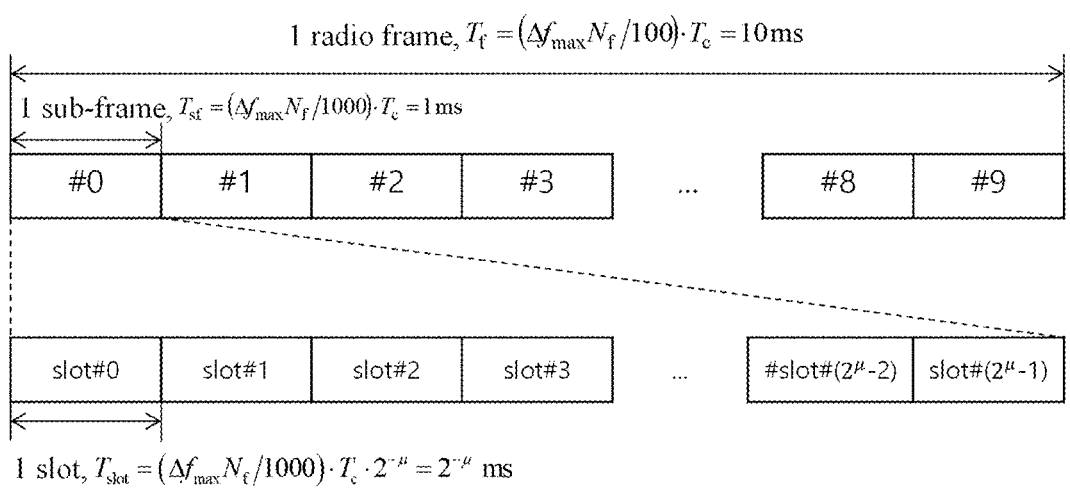
FIG. 1 illustrates an example of a wireless frame structure used in a wireless communication system.

Terms used in the specification adopt general terms which are currently widely used as possible by considering functions in the present disclosure, but the terms may be changed depending on an intention of those skilled in the art, customs, and emergence of new technology. Further, in a specific case, there is a term arbitrarily selected by an applicant and in this case, a meaning thereof will be described in a corresponding description part of the present disclosure. Accordingly, it intends to be revealed that a term used in the specification should be analyzed based on not just a name of the term but a substantial meaning of the term and contents throughout the specification.

Throughout this specification and the claims that follow, when it is described that an element is "connected" to another element, the element may be "directly connected" to the other element or "electrically connected" to the other element through a third element. Further, unless explicitly described to the contrary, the word "comprise" will be understood to imply the inclusion of stated elements but not the exclusion of any other elements unless otherwise stated. Moreover, limitations such as "more than or equal to" or "less than or equal to" based on a specific threshold may be appropriately substituted with "more than" or "less than", respectively, in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a wireless technology such as universal terrestrial radio access (UTRA) or CDMA2000. The TDMA may be implemented by a wireless technology such as global system for mobile communications (GSM)/general packet radio service (GPRS)/enhanced data rates for GSM evolution (EDGE). The OFDMA may be implemented by a wireless technology such as IEEE 802.11(Wi-Fi), IEEE 802.16(WiMAX), IEEE 802-20, evolved UTRA (E-UTRA), and the like. The UTRA is a part of a universal mobile telecommunication system (UMTS). 3rd generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP new radio (NR) is a system designed separately from LTE/LTE-A, and is a system for supporting enhanced mobile broadband (eMBB), ultra-reliable and low latency communication (URLLC), and massive machine type communication (mMTC) services, which are requirements of IMT-2020. For the clear description, 3GPP NR is mainly described, but the technical idea of the present disclosure is not limited thereto.

Unless otherwise specified in this specification, a base station may refer to a next generation node B (gNB) as defined in 3GPP NR. Furthermore, unless otherwise specified, a terminal may refer to a user equipment (UE). Hereinafter, in order to facilitate understanding of the description, each content is separately divided into embodiments and described, but each of the embodiments may be used in combination with each other. In the present disclosure, the configuration of the UE may indicate configuration by the base station. Specifically, the base station may transmit a channel or signal to the UE to configured an operation of the UE or a parameter value used in a wireless communication system.

FIG. 1 illustrates an example of a wireless frame structure used in a wireless communication system.

Referring to FIG. 1, the wireless frame (or radio frame) used in the 3GPP NR system may have a length of 10 ms ($\Delta f_{max} N_f/100) * T_c$). In addition, the wireless frame includes 10 subframes (SFs) having equal sizes. Herein, $\Delta f_{max}=480*10^3$ Hz, $N_f=4096$, $T_c=1/(\Delta f_{ref}*N_{f,ref})$, $\Delta f_{ref}=15*10^3$ Hz, and $N_{f,ref}=2048$. Numbers from 0 to 9 may be respectively allocated to 10 subframes within one wireless frame. Each subframe has a length of 1 ms and may include one or more slots according to a subcarrier spacing. More specifically, in the 3GPP NR system, the subcarrier spacing that may be used is $15*2^\mu$ kHz, and $\mu$ can have a value of $\mu=0, 1, 2, 3, 4$ as subcarrier spacing configuration. That is, 15 kHz, 30 kHz, 60 kHz, 120 kHz and 240 kHz may be used for subcarrier spacing. One subframe having a length of 1 ms may include $2^\mu$ slots. In this case, the length of each slot is $2^{-\mu}$ ms. Numbers from 0 to $2^\mu-1$ may be respectively allocated to $2^\mu$ slots within one subframe. In addition, numbers from 0 to $10*2^\mu-1$ may be respectively allocated to slots within one subframe. The time resource may be distinguished by at least one of a wireless frame number (also referred to as a wireless frame index), a subframe number (also referred to as a subframe number), and a slot number (or a slot index).

Figure 2:
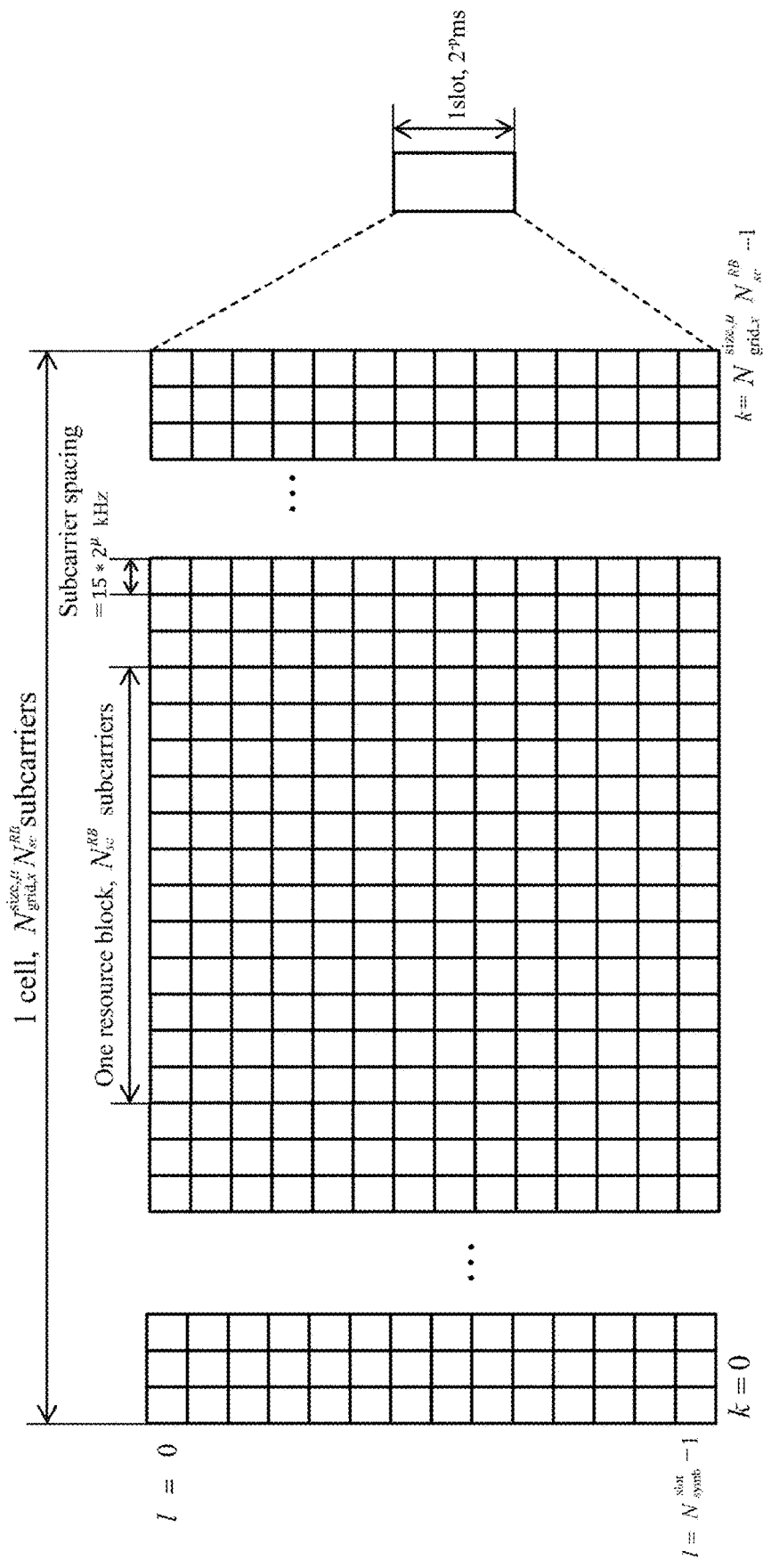
FIG. 2 illustrates an example of a downlink (DL)/uplink (UL) slot structure in a wireless communication system.

FIG. 2 illustrates an example of a downlink (DL)/uplink (UL) slot structure in a wireless communication system. In particular, FIG. 2 shows the structure of the resource grid of the 3GPP NR system.

There is one resource grid per antenna port. Referring to FIG. 2, a slot includes a plurality of orthogonal frequency division multiplexing (OFDM) symbols in a time domain and includes a plurality of resource blocks (RBs) in a frequency domain. An OFDM symbol also means one symbol section. Unless otherwise specified, OFDM symbols may be referred to simply as symbols. One RB includes 12 consecutive subcarriers in the frequency domain. Referring to FIG. 2, a signal transmitted from each slot may be represented by a resource grid including $N_{size,\mu grid,x} * N_{RBsc}$ subcarriers, and $N_{slot symb}$ OFDM symbols. Here, x=DL when the signal is a DL signal, and x=UL when the signal is an UL signal. $N_{size,\mu grid,x}$ represents the number of resource blocks (RBs) according to the subcarrier spacing constituent $\mu$ (x is DL or UL), and $N_{slot symb}$ represents the number of OFDM symbols in a slot. $N_{RBsc}$ is the number of subcarriers constituting one RB and $N_{RBsc}=12$. An OFDM symbol may be referred to as a cyclic shift OFDM (CP-OFDM) symbol or a discrete Fourier transform spread OFDM (DFT-s-OFDM) symbol according to a multiple access scheme.

The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP can only be used at 60 kHz subcarrier spacing. In FIG. 2, for convenience of description, one slot is configured with 14 OFDM symbols by way of example, but embodiments of the present disclosure may be applied in a similar manner to a slot having a different number of OFDM symbols. Referring to FIG. 2, each OFDM symbol includes $N_{size,\mu grid,x} * N_{RBsc}$ subcarriers in the frequency domain. The type of subcarrier may be divided into a data subcarrier for data transmission, a reference signal subcarrier for transmission of a reference signal, and a guard band. The carrier frequency is also referred to as the center frequency (fc).

One RB may be defined by $N_{RBsc}$ (e.g., 12) consecutive subcarriers in the frequency domain. For reference, a resource configured with one OFDM symbol and one subcarrier may be referred to as a resource element (RE) or a tone. Therefore, one RB can be configured with $N_{slot symb} * N_{RBsc}$ resource elements. Each resource element in the resource grid can be uniquely defined by a pair of indexes (k, l) in one slot. k may be an index assigned from 0 to $N_{size,\mu grid,x} * N_{RBsc}-1$ in the frequency domain, and l may be an index assigned from 0 to $N_{slot symb}-1$ in the time domain.

In order for the UE to receive a signal from the base station or to transmit a signal to the base station, the time/frequency of the UE may be synchronized with the time/frequency of the base station. This is because when the base station and the UE are synchronized, the UE can determine the time and frequency parameters necessary for demodulating the DL signal and transmitting the UL signal at the correct time.

Each symbol of a radio frame used in a time division duplex (TDD) or an unpaired spectrum may be configured with at least one of a DL symbol, an UL symbol, and a flexible symbol. A radio frame used as a DL carrier in a frequency division duplex (FDD) or a paired spectrum may be configured with a DL symbol or a flexible symbol, and a radio frame used as a UL carrier may be configured with a UL symbol or a flexible symbol. In the DL symbol, DL transmission is possible, but UL transmission is impossible. In the UL symbol, UL transmission is possible, but DL transmission is impossible. The flexible symbol may be determined to be used as a DL or an UL according to a signal.

Information on the type of each symbol, i.e., information representing any one of DL symbols, UL symbols, and flexible symbols, may be configured with a cell-specific or common radio resource control (RRC) signal. In addition, information on the type of each symbol may additionally be configured with a UE-specific or dedicated RRC signal. The base station informs, by using cell-specific RRC signals, i) the period of cell-specific slot configuration, ii) the number of slots with only DL symbols from the beginning of the period of cell-specific slot configuration, iii) the number of DL symbols from the first symbol of the slot immediately following the slot with only DL symbols, iv) the number of slots with only UL symbols from the end of the period of cell specific slot configuration, and v) the number of UL symbols from the last symbol of the slot immediately before the slot with only the UL symbol. Here, symbols not configured with any one of a UL symbol and a DL symbol are flexible symbols.

When the information on the symbol type is configured with the UE-specific RRC signal, the base station may signal whether the flexible symbol is a DL symbol or an UL symbol in the cell-specific RRC signal. In this case, the UE-specific RRC signal can not change a DL symbol or a UL symbol configured with the cell-specific RRC signal into another symbol type. The UE-specific RRC signal may signal the number of DL symbols among the Nslotsymb symbols of the corresponding slot for each slot, and the number of UL symbols among the Nslotsymb symbols of the corresponding slot. In this case, the DL symbol of the slot may be continuously configured with the first symbol to the i-th symbol of the slot. In addition, the UL symbol of the slot may be continuously configured with the j-th symbol to the last symbol of the slot (where i<j). In the slot, symbols not configured with any one of a UL symbol and a DL symbol are flexible symbols.

Figure 3:
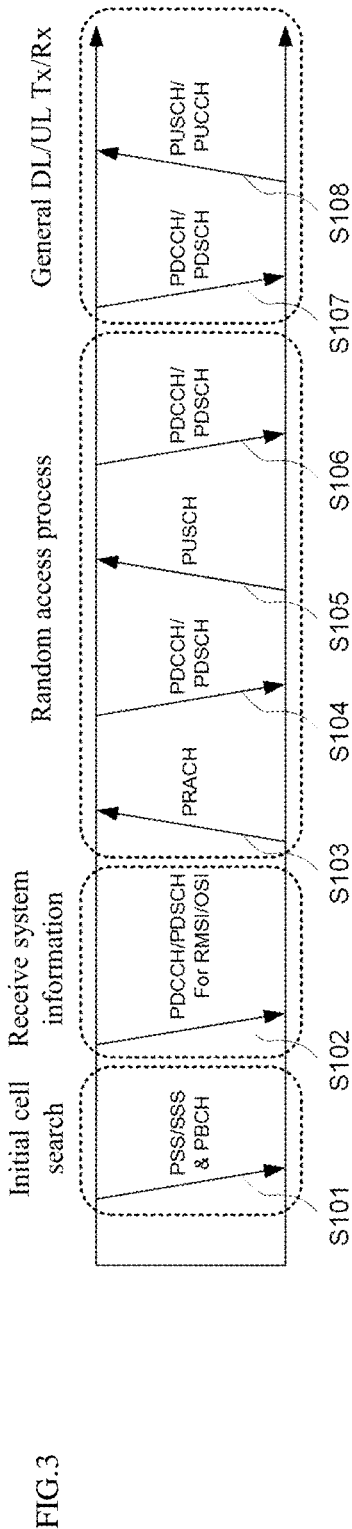
FIG. 3 is a diagram for explaining a physical channel used in a 3GPP system and a typical signal transmission method using the physical channel.

FIG. 3 is a diagram for explaining a physical channel used in a 3GPP system (e.g., NR) and a typical signal transmission method using the physical channel.

If the power of the UE is turned on or the UE camps on a new cell, the UE performs an initial cell search (S101). Specifically, the UE may synchronize with the BS in the initial cell search. For this, the UE may receive a primary synchronization signal (PSS) and a secondary synchronization signal (SSS) from the base station to synchronize with the base station, and obtain information such as a cell ID. Thereafter, the UE can receive the physical broadcast channel from the base station and obtain the broadcast information in the cell.

Upon completion of the initial cell search, the UE receives a physical downlink shared channel (PDSCH) according to the physical downlink control channel (PDCCH) and information in the PDCCH, so that the UE can obtain more specific system information than the system information obtained through the initial cell search (S102). Here, the system information received by the UE is cell-common system information for the UE to properly operate at the physical layer in Radio Resource Control (RRC), and is referred to as remaining system information (RSMI) or system information block (SIB) 1.

When the UE initially accesses the base station or does not have radio resources for signal transmission (when the UE is in RRC_IDLE mode), the UE may perform a random access procedure on the base station (operations S103 to S106). First, the UE can transmit a preamble through a physical random access channel (PRACH) (S103) and receive a response message for the preamble from the base station through the PDCCH and the corresponding PDSCH (S104). When a valid random access response message is received by the UE, the UE transmits data including the identifier of the UE and the like to the base station through a physical uplink shared channel (PUSCH) indicated by the UL grant transmitted through the PDCCH from the base station (S105). Next, the UE waits for reception of the PDCCH as an indication of the base station for collision resolution. If the UE successfully receives the PDCCH through the identifier of the UE (S106), the random access process is terminated. During the random access process, the UE may obtain UE-specific system information necessary for the UE to properly operate at the physical layer in the RRC layer. When the UE obtains UE-specific system information from the RRC layer, the UE enters the RRC_CONNECTED mode.

The RRC layer is used for message generation and management for control between a UE and a radio access network (RAN). More specifically, in the RRC layer, the base station and the UE may perform broadcasting of cell system information, delivery management of paging messages, mobility management and handover, measurement report and control thereof, UE capability management, and storage management including existing management necessary for all UEs in the cell. In general, since the update of the signal (hereinafter, referred to as RRC signal) transmitted from the RRC layer is longer than the transmission/reception period (i.e., transmission time interval, TTI) in the physical layer, the RRC signal may be maintained unchanged for a long period.

After the above-described procedure, the UE receives PDCCH/PDSCH (S107) and transmits a physical uplink shared channel (PUSCH)/physical uplink control channel (PUCCH) (S108) as a general UL/DL signal transmission procedure. In particular, the UE may receive downlink control information (DCI) through the PDCCH. The DCI may include control information such as resource allocation information for the UE. Also, the format of the DCI may vary depending on the intended use. The uplink control information (UCI) that the UE transmits to the base station through UL includes a DL/UL ACK/NACK signal, a channel quality indicator (CQI), a precoding matrix index (PMI), a rank indicator (RI), and the like. Here, the CQI, PMI, and RI may be included in channel state information (CSI). In the 3GPP NR system, the UE may transmit control information such as HARQ-ACK and CSI described above through the PUSCH and/or PUCCH.

Figure 4:
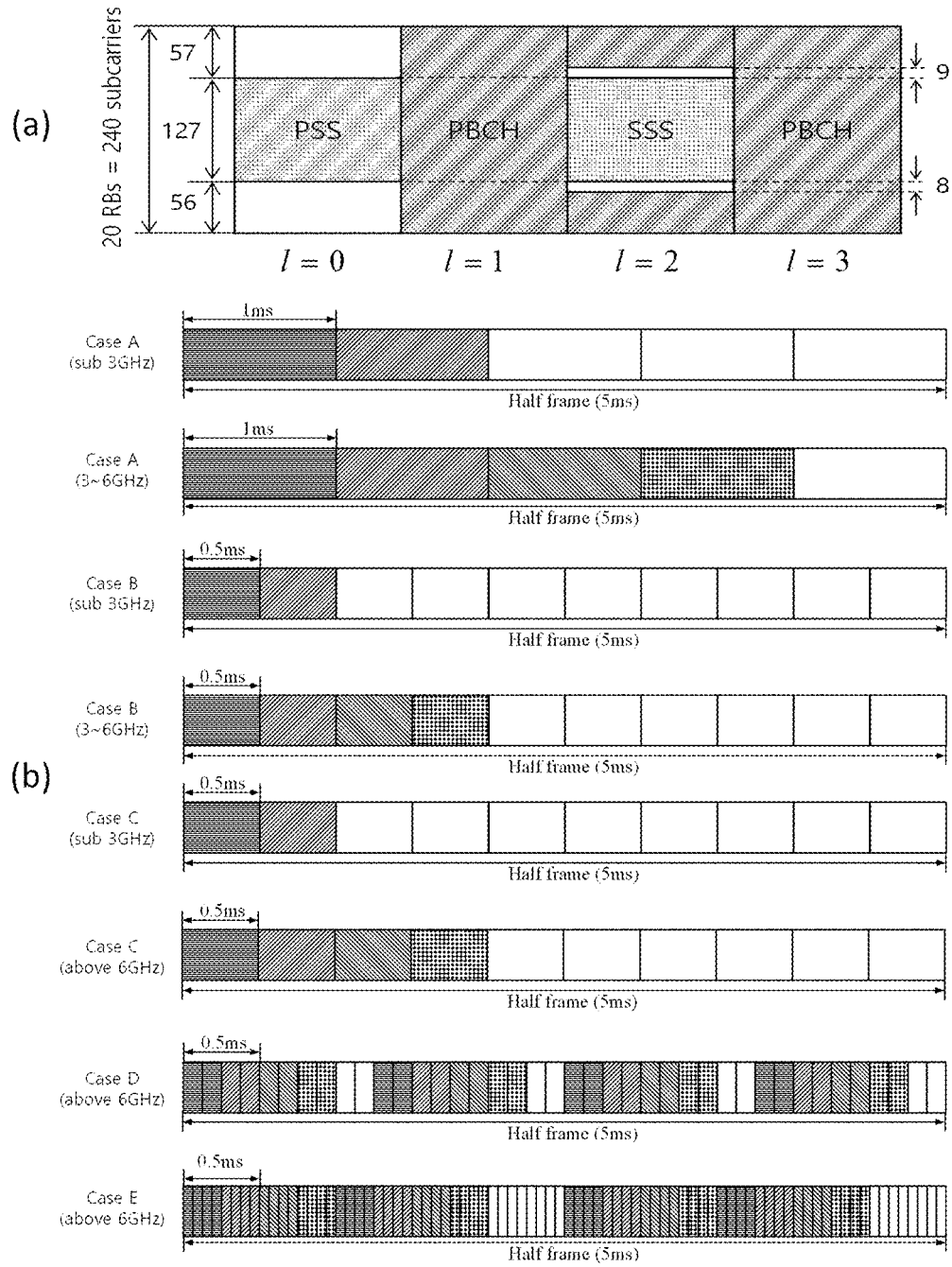
FIG. 4 illustrates an SS/PBCH block for initial cell access in a 3GPP NR system.

FIG. 4 illustrates an SS/PBCH block for initial cell access in a 3GPP NR system.

When the power is turned on or wanting to access a new cell, the UE may obtain time and frequency synchronization with the cell and perform an initial cell search procedure. The UE may detect a physical cell identity NcellID of the cell during a cell search procedure. For this, the UE may receive a synchronization signal, for example, a primary synchronization signal (PSS) and a secondary synchronization signal (SSS), from a base station, and synchronize with the base station. In this case, the UE can obtain information such as a cell identity (ID).

Referring to FIG. 4A, a synchronization signal (SS) will be described in more detail. The synchronization signal can be classified into PSS and SSS. The PSS may be used to obtain time domain synchronization and/or frequency domain synchronization, such as OFDM symbol synchronization and slot synchronization. The SSS can be used to obtain frame synchronization and cell group ID. Referring to FIG. 4A and Table 2, the SS/PBCH block can be configured with consecutive 20 RBs (=240 subcarriers) in the frequency axis, and can be configured with consecutive 4 OFDM symbols in the time axis. In this case, in the SS/PBCH block, the PSS is transmitted in the first OFDM symbol and the SSS is transmitted in the third OFDM symbol through the 56th to 182th subcarriers. Here, the lowest subcarrier index of the SS/PBCH block is numbered from 0. In the first OFDM symbol in which the PSS is transmitted, the base station does not transmit a signal through the remaining subcarriers, i.e., 0th to 55th and 183th to 239th subcarriers. In addition, in the third OFDM symbol in which the SSS is transmitted, the base station does not transmit a signal through 48th to 55th and 183th to 191th subcarriers. The base station transmits a physical broadcast channel (PBCH) through the remaining RE except for the above signal in the SS/PBCH block.

TABLE 1

| Channel or signal | OFDM symbol number l relative to the start of an SS/PBCH block | Subcarrier number k relative to the start of an SS/PBCH block |
| --- | --- | --- |
| PSS | 0 | 56, 57, . . . , 182 |
| SSS | 2 | 56, 57, . . . , 182 |
| Set to 0 | 0 | 0, 1, . . . , 55, 183, 184, . . . , 239 |
|  | 2 | 48, 49, . . . , 55, 183, 184, . . . , 191 |
| PBCH | 1, 3 | 0, 1, . . . , 239 |
|  | 2 | 0, 1, . . . , 47. 192, 193, . . . , 239 |
| DM-RS for PBCH | 1, 3 | 0 + v, 4 + v, 8 + v, . . . , 236 + v |
|  | 2 | 0 + v, 4 + v, 8 + v, . . . , 44 + v 192 + v, 196 + v, . . . , 236 + v |

The SS allows a total of 1008 unique physical layer cell IDs to be grouped into 336 physical-layer cell-identifier groups, each group including three unique identifiers, through a combination of three PSSs and SSSs, specifically, such that each physical layer cell ID is to be only a part of one physical-layer cell-identifier group. Therefore, the physical layer cell ID NcellID=3N(1)ID+N(2)ID can be uniquely defined by the index N(1)ID ranging from 0 to 335 indicating a physical-layer cell-identifier group and the index N(2)ID ranging from 0 to 2 indicating a physical-layer identifier in the physical-layer cell-identifier group. The UE may detect the PSS and identify one of the three unique physical-layer identifiers. In addition, the UE can detect the SSS and identify one of the 336 physical layer cell IDs associated with the physical-layer identifier. In this case, the sequence dPSS(n) of the PSS is as follows.

$$d_{PSS}(n) = 1 - 2x(m)$$

$$m = (n + 43N_{ID}^{(2)}) \bmod 127$$

$$0 \leq n < 127$$

Here $x(i+7)=(x(i+4)+x(i))\bmod 2$
and is given as
[x(6) x(5) x(4) x(3) x(2) x(1) x(0)]=[1 1 1 0 1 1 0].
Further, the sequence dSSS(n) of the SSS is as follows.

$$d_{SSS}(n) = [1 - 2x_0((n+m_0)\bmod 127)][1 - 2x_1((n+m_1)\bmod 127)]$$

$$m_0 = 15\left\lfloor \frac{N_{ID}^{(1)}}{112} \right\rfloor + 5N_{ID}^{(2)}$$

$$m_1 = N_{ID}^{(1)} \bmod 112$$

$$0 \leq n < 127$$

$x_0(i+7)=(x_0(i+4)+x_0(i))\bmod 2$

Here, $x_1(i+7)=(x_1(i+1)+x_1(i))\bmod 2$ and is given as

[$x_0(6)$ $x_0(5)$ $x_0(4)$ $x_0(3)$ $x_0(2)$ $x_0(1)$ $x_0(0)$]=[0 0 0 0 0 1]

[$x_1(6)$ $x_1(5)$ $x_1(4)$ $x_1(3)$ $x_1(2)$ $x_1(1)$ $x_1(0)$]=[0 0 0 0 0 0 1]

A radio frame with a 10 ms length may be divided into two half frames with a 5 ms length. Referring to FIG. 4B, a description will be made of a slot in which SS/PBCH blocks are transmitted in each half frame. A slot in which the SS/PBCH block is transmitted may be any one of the cases A, B, C, D, and E. In the case A, the subcarrier spacing is 15 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case B, the subcarrier spacing is 30 kHz and the starting time point of the SS/PBCH block is {4, 8, 16, 20}+28*n. In this case, n=0 at a carrier frequency of 3 GHz or less. In addition, it may be n=0, 1 at carrier frequencies above 3 GHz and below 6 GHz. In the case C, the subcarrier spacing is 30 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case D, the subcarrier spacing is 120 kHz and the starting time point of the SS/PBCH block is the ({4, 8, 16, 20}+28*n)-th symbol. In this case, at a carrier frequency of 6 GHz or more, n=0, 1, 2, 3, 5, 6, 7, 8, 10, 11, 12, 13, 15, 16, 17, 18. In the case E, the subcarrier spacing is 240 kHz and the starting time point of the SS/PBCH block is the ({8, 12, 16, 20, 32, 36, 40, 44}+56*n)-th symbol. In this case, at a carrier frequency of 6 GHz or more, n=0, 1, 2, 3, 5, 6, 7, 8.

Figure 5A:
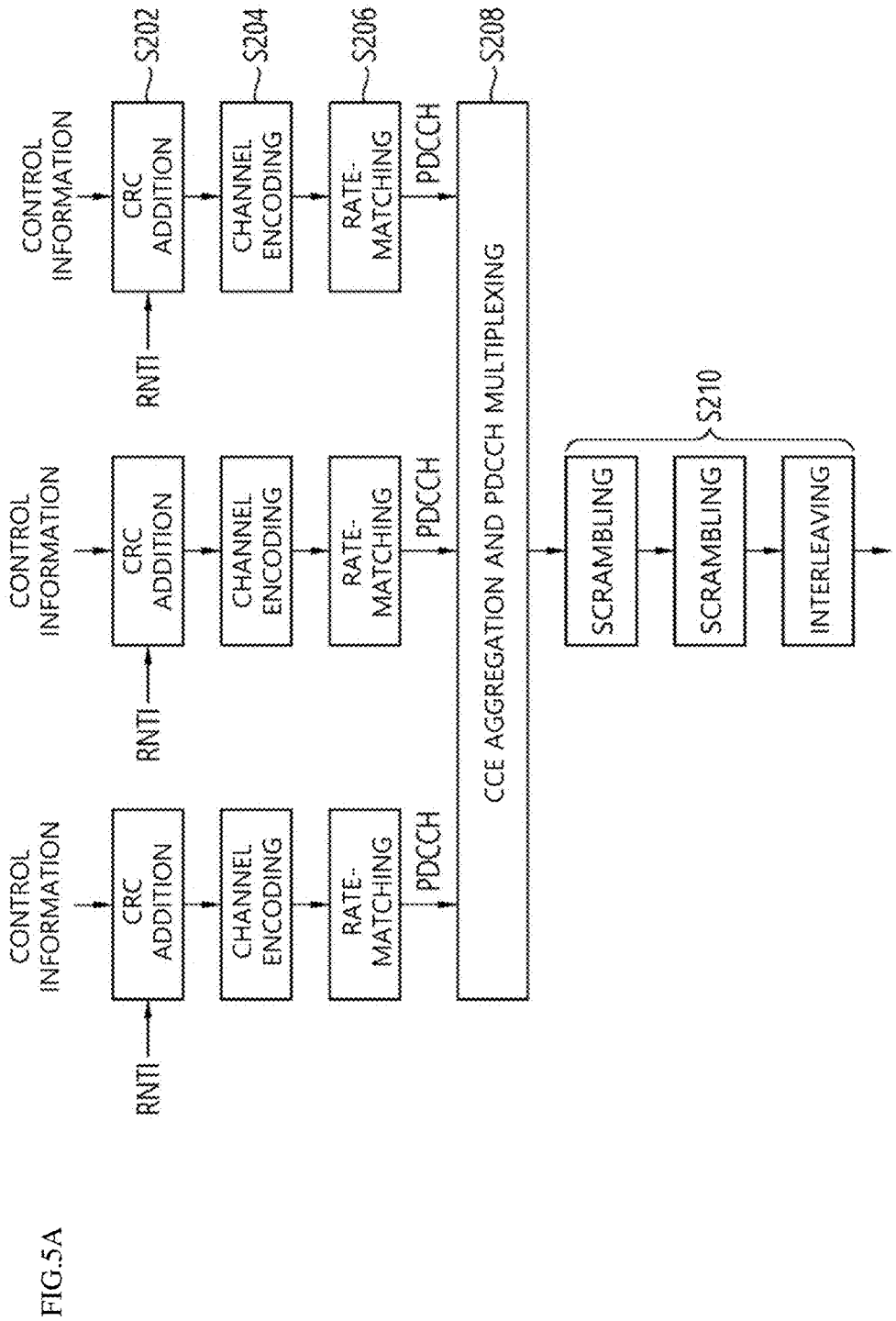

FIG. 5 illustrates a procedure for transmitting control information and a control channel in a 3GPP NR system. Referring to FIG. 5A, the base station may add a cyclic redundancy check (CRC) masked (e.g., an XOR operation) with a radio network temporary identifier (RNTI) to control information (e.g., downlink control information (DCI)) (S202). The base station may scramble the CRC with an RNTI value determined according to the purpose/target of each control information. The common RNTI used by one or more UEs can include at least one of a system information RNTI (SI-RNTI), a paging RNTI (P-RNTI), a random access RNTI (RA-RNTI), and a transmit power control RNTI (TPC-RNTI). In addition, the UE-specific RNTI may include at least one of a cell temporary RNTI (C-RNTI), and the CS-RNTI. Thereafter, the base station may perform rate-matching (S206) according to the amount of resource(s) used for PDCCH transmission after performing channel encoding (e.g., polar coding) (S204). Thereafter, the base station may multiplex the DCI(s) based on the control channel element (CCE) based PDCCH structure (S208). In addition, the base station may apply an additional process (S210) such as scrambling, modulation (e.g., QPSK), interleaving, and the like to the multiplexed DCI(s), and then map the DCI(s) to the resource to be transmitted. The CCE is a basic resource unit for the PDCCH, and one CCE may include a plurality (e.g., six) of resource element groups (REGs). One REG may be configured with a plurality (e.g., 12) of REs. The number of CCEs used for one PDCCH may be defined as an aggregation level. In the 3GPP NR system, an aggregation level of 1, 2, 4, 8, or 16 may be used. FIG. 5B is a diagram related to a CCE aggregation level and the multiplexing of a PDCCH and illustrates the type of a CCE aggregation level used for one PDCCH and CCE(s) transmitted in the control area according thereto.

Figure 6:
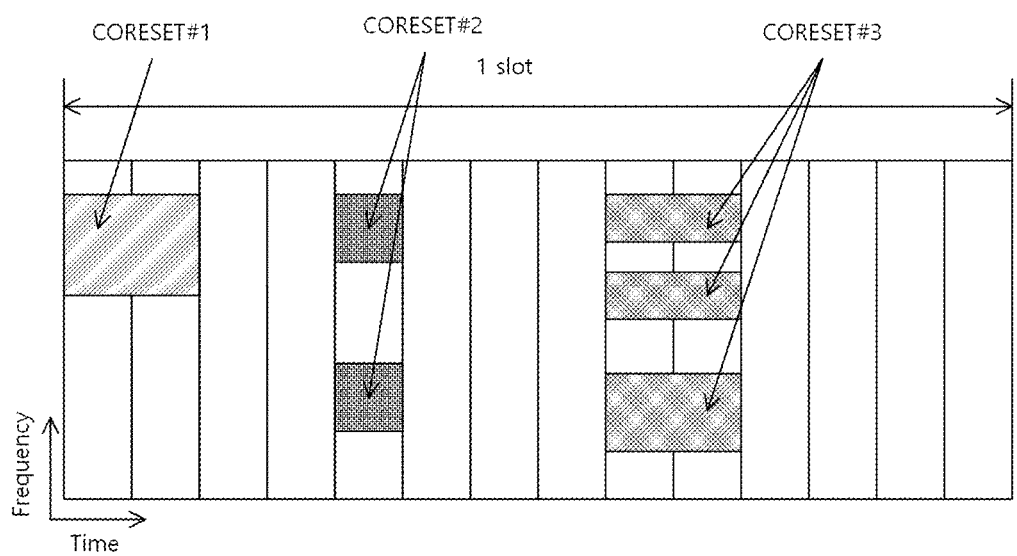
FIG. 6 illustrates a control resource set (CORESET) in which a physical downlink control channel (PUCCH) may be transmitted in a 3GPP NR system.

FIG. 6 illustrates a control resource set (CORESET) in which a physical downlink control channel (PUCCH) may be transmitted in a 3GPP NR system.

The CORESET is a time-frequency resource in which PDCCH, that is, a control signal for the UE, is transmitted. In addition, a search space to be described later may be mapped to one CORESET. Therefore, the UE may monitor the time-frequency domain designated as CORESET instead of monitoring all frequency hands for PDCCH reception, and decode the PDCCH mapped to CORESET. The base station may configure one or more CORESETs for each cell to the UE. The CORESET may be configured with up to three consecutive symbols on the time axis. In addition, the CORESET may be configured in units of six consecutive PRBs on the frequency axis. In the embodiment of FIG. 5, CORESET#1 is configured with consecutive PRBs, and CORESET#2 and CORESET#3 are configured with discontinuous PRBs. The CORESET can be located in any symbol in the slot. For example, in the embodiment of FIG. 5, CORESET#1 starts at the first symbol of the slot, CORESET#2 starts at the fifth symbol of the slot, and CORESET#9 starts at the ninth symbol of the slot.

Figure 7:
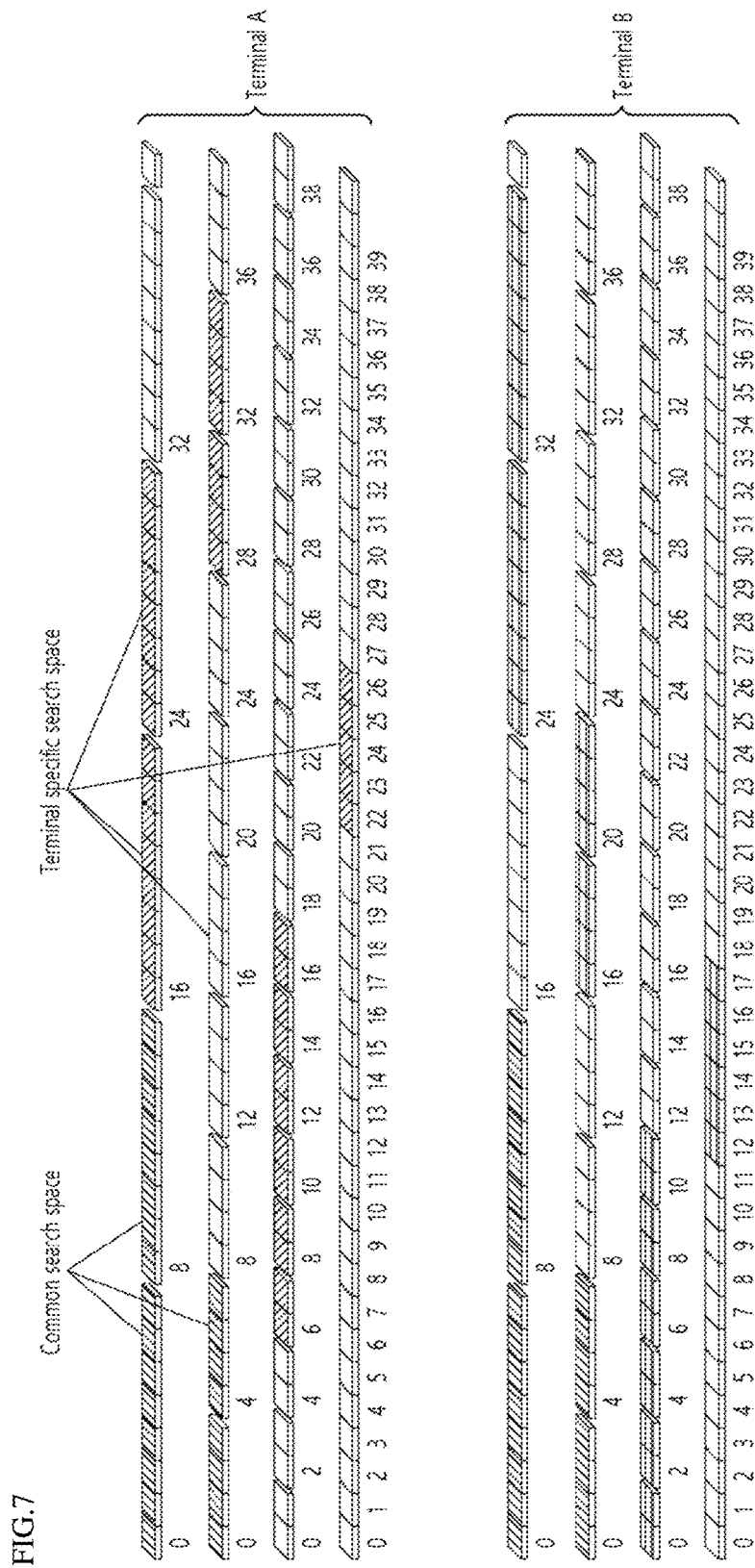
FIG. 7 illustrates a method for configuring a PDCCH search space in a 3GPP NR system.

FIG. 7 illustrates a method for setting a PUCCH search space in a 3GPP NR system.

In order to transmit the PDCCH to the UE, each CORESET may have at least one search space. In the embodiment of the present disclosure, the search space is a set of all time-frequency resources (hereinafter, PDCCH candidates) through which the PDCCH of the UE is capable of being transmitted. The search space may include a common search space that the UE of the 3GPP NR is required to commonly search and a Terminal-specific or a UE-specific search space that a specific UE is required to search. In the common search space, UE may monitor the PDCCH that is set so that all UEs in the cell belonging to the same base station commonly search. In addition, the UE-specific search space may be set for each UE so that UEs monitor the PDCCH allocated to each UE at different search space position according to the UE. In the case of the UE-specific search space, the search space between the UEs may be partially overlapped and allocated due to the limited control area in which the PDCCH may be allocated. Monitoring the PDCCH includes blind decoding for PDCCH candidates in the search space. When the blind decoding is successful, it may he expressed that the PDCCH is (successfully) detected/received and when the blind decoding fails, it may be expressed that the PDCCH is not detected/not received, or is not successfully detected/received.

For convenience of explanation, a PDCCH scrambled with a group common (GC) RNTI previously known to UEs so as to transmit DL control information to the one or more UEs is referred to as a group common (GC) PDCCH or a common PDCCH. In addition, a PDCCH scrambled with a specific-terminal RNTI that a specific UE already knows so as to transmit UL scheduling information or DL scheduling information to the specific UE is referred to as a specific-UE PDCCH. The common PDCCH may be included in a common search space, and the UE-specific PDCCH may be included in a common search space or a UE-specific PDCCH.

The base station may signal each UE or UE group through a PDCCH about information (i.e., DL Grant) related to resource allocation of a paging channel (PCH) and a downlink-shared channel (DL-SCH) that are a transmission channel or information (i.e., UL grant) related to resource allocation of a uplink-shared channel (UL-SCH) and a hybrid automatic repeat request (HARQ). The base station may transmit the PCH transport block and the DL-SCH transport block through the PDSCH. The base station may transmit data excluding specific control information or specific service data through the PDSCH. In addition, the UE may receive data excluding specific control information or specific service data through the PDSCH.

The base station may include, in the PDCCH, information on to which UE (one or a plurality of UEs) PDSCH data is transmitted and how the PDSCH data is to be received and decoded by the corresponding UE, and transmit the PDCCH. For example, it is assumed that the DCI transmitted on a specific PDCCH is CRC masked with an RNTI of "A", and the DCI indicates that PDSCH is allocated to a radio resource (e.g., frequency location) of "B" and indicates transmission format information (e.g., transport block size, modulation scheme, coding information, etc.) of "C". The UE monitors the PDCCH using the RNTI information that the UE has. In this case, if there is a UE which performs blind decoding the PDCCH using the "A" RNTI, the UE receives the PDCCH, and receives the PDSCH indicated by "B" and "C" through the received PDCCH information.

Table 2 shows an embodiment of a physical uplink control channel (PUCCH) used in a wireless communication system.

TABLE 2

| PUCCH format | Length in OFDM symbols | Number of bits |
| --- | --- | --- |
| 0 | 1-2 | ≤2 |
| 1 | 4-14 | ≤2 |
| 2 | 1-2 | >2 |
| 3 | 4-14 | >2 |
| 4 | 4-14 | >2 |

PUCCH may be used to transmit the following UL control information (UCI).
  Scheduling Request (SR): Information used for requesting a UL UL-SCH resource.
  HARQ-ACK: A Response to PDCCH (indicating DL SPS release) and/or a response to DL transport block (TB) on PDSCH. HARQ-ACK indicates whether information transmitted on the PDCCH or PDSCH is received. The HARQ-ACK response includes positive ACK (simply ACK), negative ACK (hereinafter NACK), Discontinuous Transmission (DTX), or NACK/DTX. Here, the term HARQ-ACK is used mixed with HARQ-ACK/NACK and ACK/NACK. In general, ACK may be represented by bit value 1 and NACK may be represented by bit value 0.
  Channel State Information (CSI): Feedback information on the DL channel. The UE generates it based on the CSI-Reference Signal (RS) transmitted by the base station. Multiple Input Multiple Output (MIMO)-related feedback information includes a Rank Indicator (RI) and a Precoding Matrix Indicator (PMI). CSI can be divided into CSI part 1 and CSI part 2 according to the information indicated by CSI.

In the 3GPP NR system, five PUCCH formats may be used to support various service scenarios, various channel environments, and frame structures.

PUCCH format 0 is a format capable of transmitting 1-bit or 2-bit HARQ-ACK information or SR. PUCCH format 0 can be transmitted through one or two OFDM symbols on the time axis and one RB on the frequency axis. When PUCCH format 0 is transmitted in two OFDM symbols, the same sequence to the two symbols may be transmitted through different RBs. In this case, the sequence may be a cyclic shift (CS) sequence from the base sequence used for PUCCH format 0. Through this, the UE can obtain a frequency diversity gain. Specifically, the UE may determine a cyclic shift (CS) value $m_{cs}$ according to the $M_{bit}$ bit UCI ($M_{bit}$=1 or 2). In addition, a sequence in which a base sequence of length 12 is cyclically shifted based on a predetermined CS value $m_{cs}$ may be mapped to 1 OFDM symbol and 12 REs of 1 RB and transmitted. When the number of cyclic shifts available to the UE is 12 and $M_{bit}$=1, 1 bit UCI 0 and 1 may be mapped to two cyclic shifted sequences having a difference of 6 cyclic shift values, respectively. In addition, when $M_{bit}$=2, 2bits UCI 00, 01, 11, and 10 may be mapped to four cyclic shifted sequences in which the difference in cyclic shift values is 3, respectively.

PUCCH format 1 may deliver 1-bit or 2-bit HARQ-ACK information or SR. PUCCH format 1 may be transmitted through consecutive OFDM symbols on the time axis and one PRB on the frequency axis. Here, the number of OFDM symbols occupied by PUCCH format 1 may be one of 4 to 14. More specifically, UCI which is Mbit=1, may be BPSK-modulated. The UE may modulate UCI, which is Mbit=2, with quadrature phase shift keying (QPSK). A signal is obtained by multiplying a modulated complex valued symbol d(0) by a sequence of length 12. In this case, the sequence may be a base sequence used for PUCCH format 0. The UE spreads the even-numbered OFDM symbols to which PUCCH format 1 is allocated through the time axis orthogonal cover code (OCC) to transmit the obtained signal. PUCCH format 1 determines the maximum number of different UEs multiplexed in the one RB according to the length of the OCC to be used. A demodulation reference signal (DMRS) may be spread with OCC and mapped to the odd-numbered OFDM symbols of PUCCH format 1.

PUCCH format 2 may deliver UCI exceeding 2 bits. PUCCH format 2 may be transmitted through one or two OFDM symbols on the time axis and one or a plurality of RBs on the frequency axis. When PUCCH format 2 is transmitted in two OFDM symbols, the sequences which are transmitted in different RBs through the two OFDM symbols may be same each other. Here, the sequence may be a plurality of modulated complex valued symbols d(0), . . . , d(Msymbol-1). Here, Msymbol may be Mbit/2. Through this, the UE may obtain a frequency diversity gain. More specifically, Mbit bit UCI (Mbit>2) is bit-level scrambled, QPSK modulated, and mapped to RB(s) of one or two OFDM symbol(s). Here, the number of RBs may be one of 1 to 16.

PUCCH format 3 or PUCCH format 4 may deliver UCI exceeding 2 bits. PUCCH format 3 or PUCCH format 4 may be transmitted through consecutive OFDM symbols on the time axis and one PRB on the frequency axis. The number of OFDM symbols occupied by PUCCH format 3 or PUCCH format 4 may be one of 4 to 14. Specifically, the UE modulates Mbit bits UCI (Mbit>2) with π/2-Binary Phase Shift Keying (BPSK) or QPSK to generate a complex valued symbol d(0) to d(Msymb-1). Here, when using π/2-BPSK, Msymb=Mbit, and when using QPSK, Msymb=Mbit/2. The UE may not apply block-unit spreading to the PUCCH format 3. However, the UE may apply block-unit spreading to one RB (i.e., 12 subcarriers) using PreDFT-OCC of a length of 12 such that PUCCH format 4 may have two or four multiplexing capacities. The UE performs transmit precoding (or DFT-precoding) on the spread signal and maps it to each RE to transmit the spread signal.

In this case, the number of RBs occupied by PUCCH format 2, PUCCH format 3, or PUCCH format 4 may be determined according to the length and maximum code rate of the UCI transmitted by the UE. When the UE uses PUCCH format 2, the UE may transmit HARQ-ACK information and CSI information together through the PUCCH. When the number of RBs that the UE may transmit is greater than the maximum number of RBs that PUCCH format 2, or PUCCH format 3, or PUCCH format 4 may use, the UE may transmit only the remaining UCI information without transmitting some UCI information according to the priority of the UCI information.

PUCCH format 1, PUCCH format 3, or PUCCH format 4 may be configured through the RRC signal to indicate frequency hopping in a slot. When frequency hopping is configured, the index of the RB to be frequency hopped may be configured with an RRC signal. When PUCCH format 1, PUCCH format 3, or PUCCH format 4 is transmitted through N OFDM symbols on the time axis, the first hop may have floor (N/2) OFDM symbols and the second hop may have cciling(N/2) OFDM symbols.

PUCCH format 1, PUCCH format 3, or PUCCH format 4 may be configured to be repeatedly transmitted in a plurality of slots. In this case, the number K of slots in which the PUCCH is repeatedly transmitted may be configured by the RRC signal. The repeatedly transmitted PUCCHs must start at an OFDM symbol of the constant position in each slot, and have the constant length. When one OFDM symbol among OFDM symbols of a slot in which a UE should transmit a PUCCH is indicated as a DL symbol by an RRC signal, the UE may not transmit the PUCCH in a corresponding slot and delay the transmission of the PUCCH to the next slot to transmit the PUCCH.

Meanwhile, in the 3GPP NR system, the UE may perform transmission/reception using a bandwidth less than or equal to the bandwidth of the carrier (or cell). To this end, the UE may be configured with a bandwidth part (BWP) consisting of a continuous bandwidth of a portion of the bandwidth of the carrier. A UE operating according to TDD or operating in an unpaired spectrum may receive up to four DL/UL BWP pairs for one carrier (or cell). In addition, the UE may activate one DL/UL BWP pair. A UE operating according to FDD or operating in a paired spectrum may receive up to 4 DL BWPs on a downlink carrier (or cell) and up to 4 UL BWPs on an uplink carrier (or cell). The UE may activate one DL BWP and UL BWP for each carrier (or cell). The UE may not receive or transmit in time-frequency resources other than the activated BWP. The activated BWP may be referred to as an active BWP.

The base station may indicate an activated BWP among the BWPs configured by the UE through downlink control information (DCI). The BWP indicated through DCI is activated, and other configured BWP(s) are deactivated. In a carrier (or cell) operating in TDD, the base station may include a bandwidth part indicator (BPI) indicating the BWP activated in the DCI scheduling the PDSCH or PUSCH to change the DL/UL BWP pair of the UE. The UE may receive a DCI scheduling a PDSCH or a PUSCH and may identify a DL/UL BWP pair activated based on the BPI. In the case of a downlink carrier (or cell) operating in FDD, the base station may include a BPI indicating the activated BWP to the DCI scheduling the PDSCH to change the DL BWP of the UE. In the case of an uplink carrier (or cell) operating in FDD, the base station may include a BPI indicating the activated BWP to the DCI scheduling the PUSCH to change the UL BWP of the UE.

Figure 8:
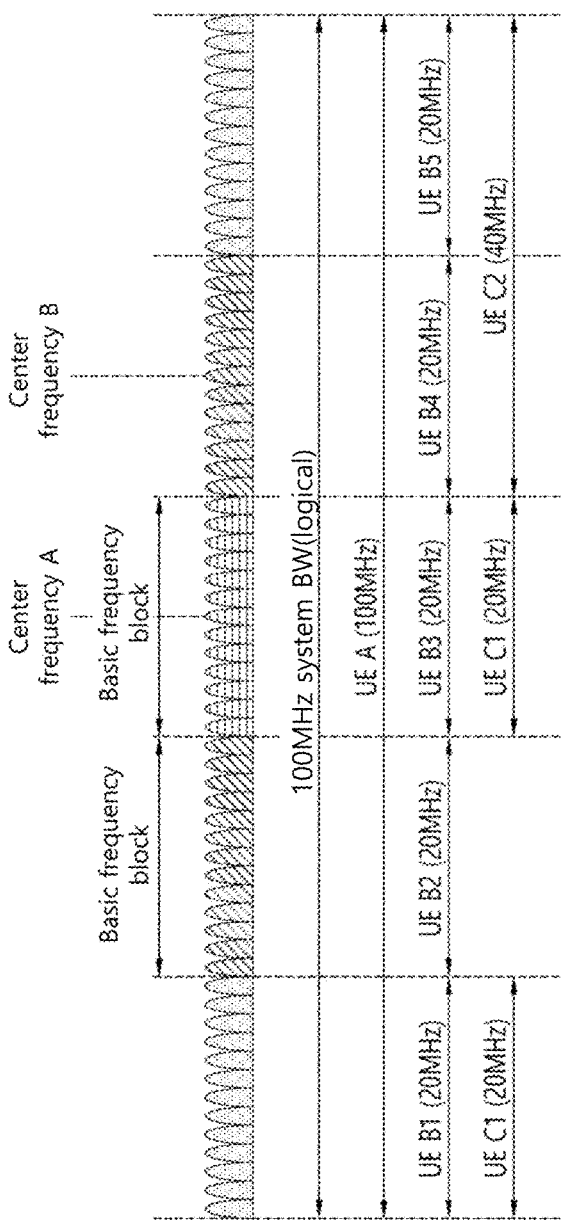
FIG. 8 is a conceptual diagram illustrating carrier aggregation.

FIG. 8 is a conceptual diagram illustrating carrier aggregation.

The carrier aggregation is a method in which the UE uses a plurality of frequency blocks or cells (in the logical sense) configured with UL resources (or component carriers) and/or DL resources (or component carriers) as one large logical frequency band in order for a wireless communication system to use a wider frequency band. One component carrier may also be referred to as a term called a Primary cell (PCell) or a Secondary cell (SCell), or a Primary SCell (PScell). However, hereinafter, for convenience of description, the term "component carrier" is used.

Referring to FIG. 8, as an example of a 3GPP NR system, the entire system band may include up to 16 component carriers, and each component carrier may have a bandwidth of up to 400 MHz. The component carrier may include one or more physically consecutive subcarriers. Although it is shown in FIG. 8 that each of the component carriers has the same bandwidth, this is merely an example, and each component carrier may have a different bandwidth. Also, although each component carrier is shown as being adjacent to each other in the frequency axis, the drawings are shown in a logical concept, and each component carrier may be physically adjacent to one another, or may be spaced apart.

Different center frequencies may be used for each component carrier. Also, one common center frequency may be used in physically adjacent component carriers. Assuming that all the component carriers are physically adjacent in the embodiment of FIG. 8, center frequency A may be used in all the component carriers. Further, assuming that the respective component carriers are not physically adjacent to each other, center frequency A and the center frequency B can be used in each of the component carriers.

When the total system band is extended by carrier aggregation, the frequency hand used for communication with each UE can be defined in units of a component carrier. UE A may use 100 MHz, which is the total system band, and performs communication using all five component carriers. UEs B1~B5 can use only a 20 MHz bandwidth and perform communication using one component carrier. UEs C1 and C2 may use a 40 MHz bandwidth and perform communication using two component carriers, respectively. The two component carriers may be logically/physically adjacent or non-adjacent. UE C1 represents the case of using two non-adjacent component carriers, and UE C2 represents the case of using two adjacent component carriers.

Figure 9:
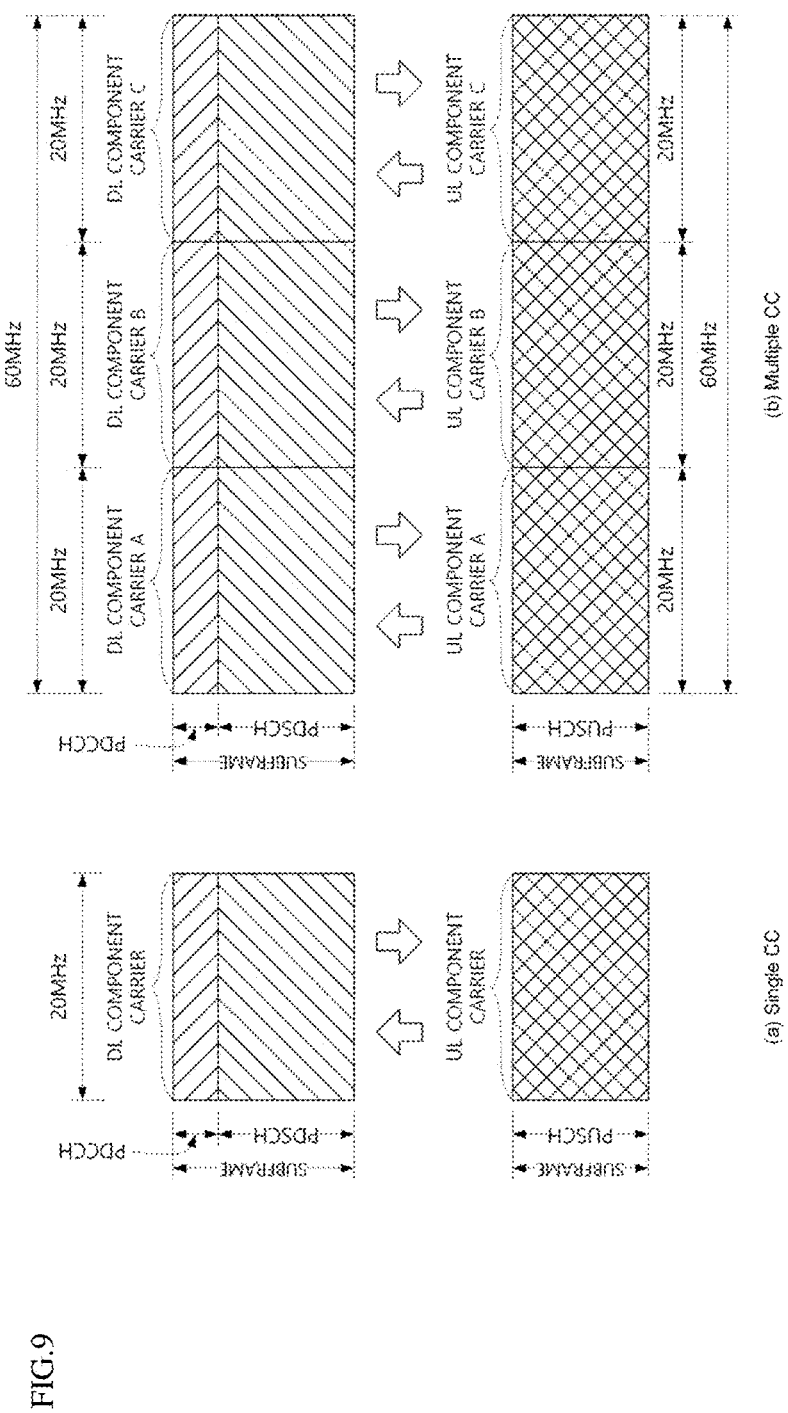
FIG. 9 is a diagram for explaining signal carrier communication and multiple carrier communication.

FIG. 9 is a drawing for explaining signal carrier communication and multiple carrier communication. Particularly, FIG. 9A shows a single carrier subframe structure and FIG. 9B shows a multi-carrier subframe structure.

Referring to FIG. 9A, in an FDD mode, a general wireless communication system may perform data transmission or reception through one DL band and one UL band corresponding thereto. In another specific embodiment, in a TDD mode, the wireless communication system may divide a radio frame into a UL time unit and a DL time unit in a time domain, and perform data transmission or reception through a UL/DL time unit. Referring to FIG. 9B, three 20 MHz component carriers (CCs) can be aggregated into each of UL and DL, so that a bandwidth of 60 MHz can be supported. Each CC may be adjacent or non-adjacent to one another in the frequency domain. FIG. 9B shows a case where the bandwidth of the UL CC and the bandwidth of the DL CC are the same and symmetric, but the bandwidth of each CC can be determined independently. In addition, asymmetric carrier aggregation with different number of UL CCs and DL CCs is possible. A DL/UL CC allocated/configured to a specific UE through RRC may be called as a serving DL/UL CC of the specific UE.

The base station may perform communication with the UE by activating some or all of the serving CCs of the UE or deactivating some CCs. The base station can change the CC to be activated/deactivated, and change the number of CCs to be activated/deactivated. If the base station allocates a CC available for the UE as to be cell-specific or UE-specific, at least one of the allocated CCs can be deactivated, unless the CC allocation for the UE is completely reconfigured or the UE is handed over. One CC that is not deactivated by the UE is called as a Primary CC (PCC) or a primary cell (PCell), and a CC that the base station can freely activate/deactivate is called as a Secondary CC (SCC) or a secondary cell (SCell).

Meanwhile, 3GPP NR uses the concept of a cell to manage radio resources. A cell is defined as a combination of DL resources and UL resources, that is, a combination of DL CC and UL CC. A cell may be configured with DL resources alone, or a combination of DL resources and UL resources. When the carrier aggregation is supported, the linkage between the carrier frequency of the DL resource (or DL CC) and the carrier frequency of the UL resource (or UL CC) may be indicated by system information. The carrier frequency refers to the center frequency of each cell or CC. A cell corresponding to the PCC is referred to as a PCell, and a cell corresponding to the SCC is referred to as an SCell. The carrier corresponding to the PCell in the DL is the DL PCC, and the carrier corresponding to the PCell in the UL is the UL PCC. Similarly, the carrier corresponding to the SCell in the DL is the DL SCC and the carrier corresponding to the SCell in the UL is the UL SCC. According to UE capability, the serving cell(s) may be configured with one PCell and zero or more SCells. In the case of UEs that are in the RRC_CONNECTED state but not configured for carrier aggregation or that do not support carrier aggregation, there is only one serving cell configured only with PCell.

As mentioned above, the term "cell" used in carrier aggregation is distinguished from the term "cell" which refers to a certain geographical area in which a communication service is provided by one base station or one antenna group. That is, one component carrier may also be referred to as a scheduling cell, a scheduled cell, a primary cell (PCell), a secondary cell (SCell), or a primary SCell (PScell). However, in order to distinguish between a cell referring to a certain geographical area and a cell of carrier aggregation, in the present disclosure, a cell of a carrier aggregation is referred to as a CC, and a cell of a geographical area is referred to as a cell.

Figure 10:
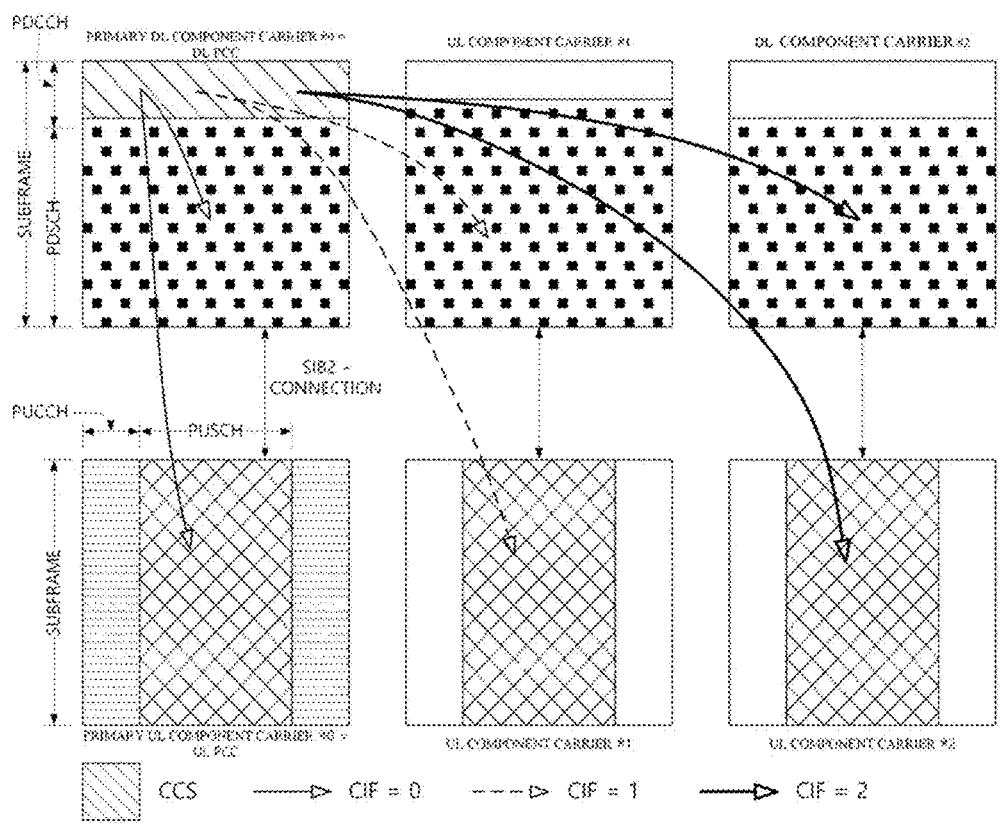
FIG. 10 is a diagram showing an example in which a cross carrier scheduling technique is applied.

FIG. 10 is a diagram showing an example in which a cross carrier scheduling technique is applied. When cross carrier scheduling is set, the control channel transmitted through the first CC may schedule a data channel transmitted through the first CC or the second CC using a carrier indicator field (CIF). The CIF is included in the DCI. In other words, a scheduling cell is set, and the DL grant/UL grant transmitted in the PDCCH area of the scheduling cell schedules the PDSCH/PUSCH of the scheduled cell. That is, a search area for the plurality of component carriers exists in the PDCCH area of the scheduling cell. A PCell may be basically a scheduling cell, and a specific SCell may be designated as a scheduling cell by an upper layer.

In the embodiment of FIG. 10, it is assumed that three DL CCs are merged. Here, it is assumed that DL component carrier #0 is DL PCC (or PCell), and DL component carrier

1 and DL component carrier #2 are DL SCCs (or SCell). In addition, it is assumed that the DL PCC is set to the PDCCH monitoring CC. When cross-carrier scheduling is not configured by UE-specific (or UE-group-specific or cell-specific) higher layer signaling, a CIF is disabled, and each DL CC can transmit only a PDCCH for scheduling its PDSCH without the CIF according to an NR PDCCH rule (non-cross-carrier scheduling, self-carrier scheduling). Meanwhile, if cross-carrier scheduling is configured by UE-specific (or UE-group-specific or cell-specific) higher layer signaling, a CIF is enabled, and a specific CC (e.g., DL PCC) may transmit not only the PDCCH for scheduling the PDSCH of the DL CC A using the CIF but also the PDCCH for scheduling the PDSCH of another CC (cross-carrier scheduling). On the other hand, a PDCCH is not transmitted in another DL CC. Accordingly, the UE monitors the PDCCH not including the CIF to receive a self-carrier scheduled PDSCH depending on whether the cross-carrier scheduling is configured for the UE, or monitors the PDCCH including the CIF to receive the cross-carrier scheduled PDSCH.

On the other hand, FIGS. 9 and 10 illustrate the subframe structure of the 3GPP LTE-A system, and the same or similar configuration may be applied to the 3GPP NR system. However, in the 3GPP NR system, the subframes of FIGS. 9 and 10 may be replaced with slots.

Figure 11:
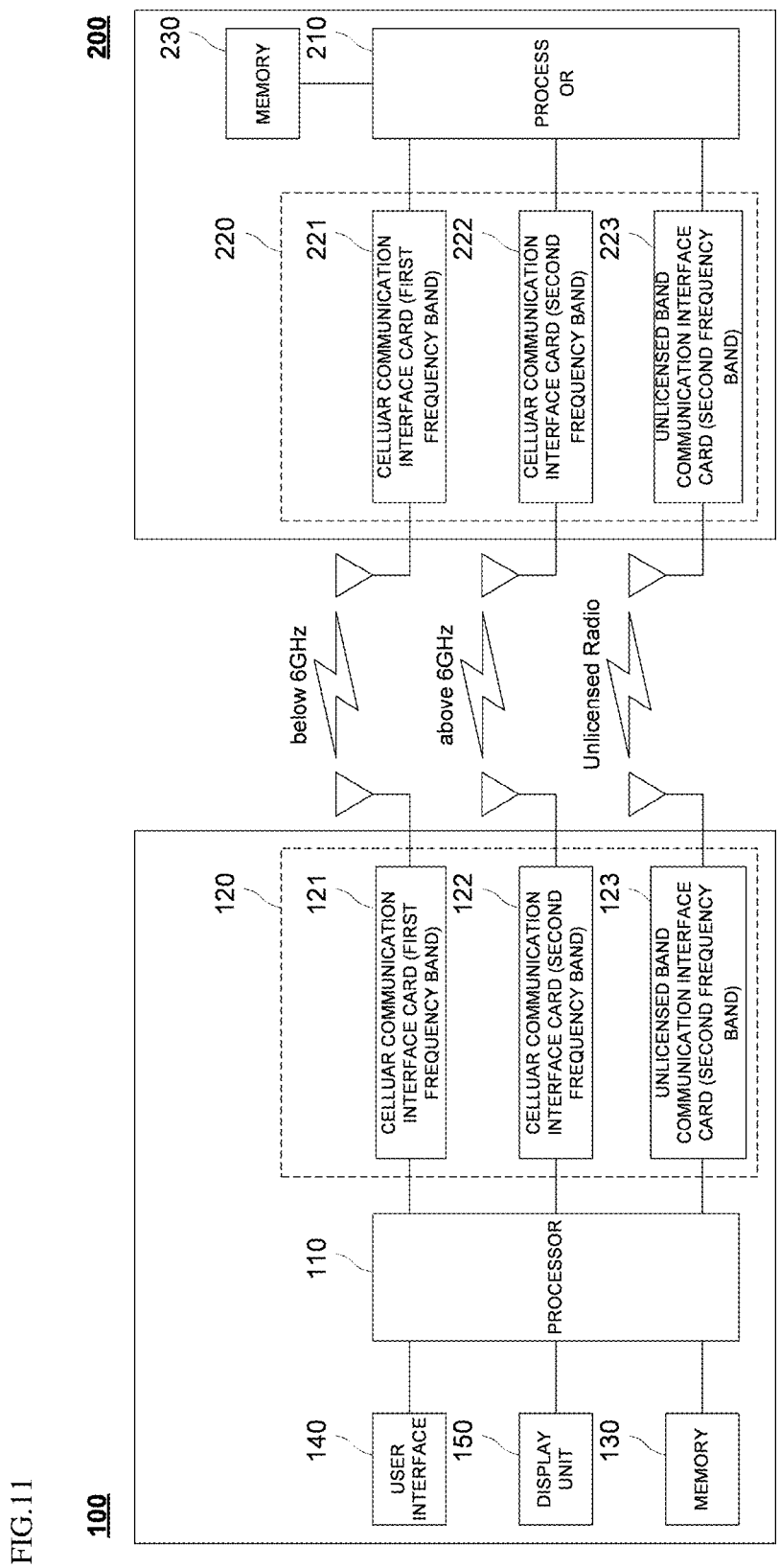
FIG. 11 is a block diagram showing the configurations of a UE and a base station according to an embodiment of the present disclosure.

FIG. 11 is a block diagram showing the configurations of a UE and a base station according to an embodiment of the present disclosure. In an embodiment of the present disclosure, the UE may be implemented with various types of wireless communication devices or computing devices that are guaranteed to be portable and mobile. The UE may be referred to as a User Equipment (UE), a Station (STA), a Mobile Subscriber (MS), or the like. In addition, in an embodiment of the present disclosure, the base station controls and manages a cell (e.g., a macro cell, a femto cell, a pico cell, etc.) corresponding to a service area, and performs functions of a signal transmission, a channel designation, a channel monitoring, a self diagnosis, a relay, or the like. The base station may be referred to as next Generation NodeB (gNB) or Access Point (AP).

As shown in the drawing, a UE 100 according to an embodiment of the present disclosure may include a processor 110, a communication module 120, a memory 130, a user interface 140, and a display unit 150.

First, the processor 110 may execute various instructions or programs and process data within the UE 100. In addition, the processor 110 may control the entire operation including each unit of the UE 100, and may control the transmission/ reception of data between the units. Here, the processor 110 may be configured to perform an operation according to the embodiments described in the present disclosure. For example, the processor 110 may receive slot configuration information, determine a slot configuration based on the slot configuration information, and perform communication according to the determined slot configuration.

Next, the communication module 120 may be an integrated module that performs wireless communication using a wireless communication network and a wireless LAN access using a wireless LAN. For this, the communication module 120 may include a plurality of network interface cards (NICs) such as cellular communication interface cards 121 and 122 and an unlicensed band communication interface card 123 in an internal or external form. In the drawing, the communication module 120 is shown as an integral integration module, but unlike the drawing, each network interface card can be independently arranged according to a circuit configuration or usage.

The cellular communication interface card 121 may transmit or receive a radio signal with at least one of the base station 200, an external device, and a server by using a mobile communication network and provide a cellular communication service in a first frequency band based on the instructions from the processor 110. According to an embodiment, the cellular communication interface card 121 may include at least one NIC module using a frequency band of less than 6 GHz. At least one NIC module of the cellular communication interface card 121 may independently perform cellular communication with at least one of the base station 200, an external device, and a server in accordance with cellular communication standards or protocols in the frequency bands below 6 GHz supported by the corresponding NIC module.

The cellular communication interface card 122 may transmit or receive a radio signal with at least one of the base station 200, an external device, and a server by using a mobile communication network and provide a cellular communication service in a second frequency band based on the instructions from the processor 110 According to an embodiment, the cellular communication interface card 122 may include at least one NIC module using a frequency band of more than 6 GHz. At least one NTC module of the cellular communication interface card 122 may independently perform cellular communication with at least one of the base station 200, an external device, and a server in accordance with cellular communication standards or protocols in the frequency bands of 6 GHz or more supported by the corresponding NIC module.

The unlicensed band communication interface card 123 transmits or receives a radio signal with at least one of the base station 200, an external device, and a server by using a third frequency band which is an unlicensed band, and provides an unlicensed band communication service based on the instructions from the processor 110. The unlicensed band communication interface card 123 may include at least one NIC module using an unlicensed band. For example, the unlicensed band may be a band of 2.4 GHz or 5 GHz. At least one NIC module of the unlicensed band communication interface card 123 may independently or dependently perform wireless communication with at least one of the base station 200, an external device, and a server according to the unlicensed band communication standard or protocol of the frequency band supported by the corresponding NIC module.

The memory 130 stores a control program used in the UE 100 and various kinds of data therefor. Such a control program may include a prescribed program required for performing wireless communication with at least one among the base station 200, an external device, and a server.

Next, the user interface 140 includes various kinds of input/output means provided in the UE 100. In other words, the user interface 140 may receive a user input using various input means, and the processor 110 may control the UE 100 based on the received user input. In addition, the user interface 140 may perform an output based on instructions from the processor 110 using various kinds of output means.

Next, the display unit 150 outputs various images on a display screen. The display unit 150 may output various display objects such as content executed by the processor 110 or a user interface based on control instructions from the processor 110.

In addition, the base station 200 according to an embodiment of the present disclosure may include a processor 210, a communication module 220, and a memory 230.

First, the processor 210 may execute various instructions or programs, and process internal data of the base station 200. In addition, the processor 210 may control the entire operations of units in the base station 200, and control data transmission and reception between the units. Here, the processor 210 may be configured to perform operations according to embodiments described in the present disclosure. For example, the processor 210 may signal slot configuration and perform communication according to the signaled slot configuration.

Next, the communication module 220 may be an integrated module that performs wireless communication using a wireless communication network and a wireless LAN access using a wireless LAN. For this, the communication module 120 may include a plurality of network interface cards such as cellular communication interface cards 221 and 222 and an unlicensed band communication interface card 223 in an internal or external form. In the drawing, the communication module 220 is shown as an integral integration module, but unlike the drawing, each network interface card can be independently arranged according to a circuit configuration or usage.

The cellular communication interface card 221 may transmit or receive a radio signal with at least one of the UE 100, an external device, and a server by using a mobile communication network and provide a cellular communication service in the first frequency hand based on the instructions from the processor 210. According to an embodiment, the cellular communication interface card 221 may include at least one NIC module using a frequency band of less than 6 GHz. The at least one NIC module of the cellular communication interface card 221 may independently perform cellular communication with at least one of the UE 100, an external device, and a server in accordance with the cellular communication standards or protocols in the frequency bands less than 6 GHz supported by the corresponding NIC module.

The cellular communication interface card 222 may transmit or receive a radio signal with at least one of the UE 100, an external device, and a server by using a mobile communication network and provide a cellular communication service in the second frequency band based on the instructions from the processor 210. According to an embodiment, the cellular communication interface card 222 may include at least one NIC module using a frequency band of 6 GHz or more. The at least one NIC module of the cellular communication interface card 222 may independently perform cellular communication with at least one of the base station 100, an external device, and a server in accordance with the cellular communication standards or protocols in the frequency bands 6 GHz or more supported by the corresponding NIC module.

The unlicensed band communication interface card 223 transmits or receives a radio signal with at least one of the base station 100, an external device, and a server by using the third frequency band which is an unlicensed band, and provides an unlicensed band communication service based on the instructions from the processor 210. The unlicensed band communication interface card 223 may include at least one NIC module using an unlicensed band. For example, the unlicensed band may be a band of 2.4 GHz or 5 GHz. At least one NIC module of the unlicensed band communication interface card 223 may independently or dependently perform wireless communication with at least one of the UE 100, an external device, and a server according to the unlicensed band communication standards or protocols of the frequency band supported by the corresponding NIC module.

FIG. 11 is a block diagram illustrating the UE 100 and the base station 200 according to an embodiment of the present disclosure, and blocks separately shown are logically divided elements of a device. Accordingly, the aforementioned elements of the device may be mounted in a single chip or a plurality of chips according to the design of the device. In addition, a part of the configuration of the UE 100, for example, a user interface 140, a display unit 150 and the like may be selectively provided in the UE 100. In addition, the user interface 140, the display unit 150 and the like may be additionally provided in the base station 200, if necessary.

In the NR wireless communication system, the UE may signal whether a downlink signal or a downlink channel is successfully received by transmitting a codebook including hybrid automatic repeat request (HARQ)-ACK information. The HARQ-ACK codebook includes one or more bits indicating whether reception of a downlink channel or downlink signal is successful. Here, the downlink channel may include at least one of a physical downlink shared channel (PDSCH), a semi-persistence scheduling (SPS) PDCSH, and a PDCCH releasing the PCSH and SPS PDSCH. The HARQ-ACK codebook may be divided into a semi-static HARQ-ACK codebook and a dynamic HARQ-ACK codebook. The base station may set one of the two HARQ-ACK codebooks to the UE. The UE may use the HARQ-ACK codebook set for the UE.

When the semi-static HARQ-ACK codebook is used, the base station may use the RRC signal to set the number of bits of the HARQ-ACK codebook and information for determining which channel or signal is successfully received by each bit of the HARQ-ACK codebook. Therefore, the base station does not need to signal information necessary for HARQ-ACK codebook transmission to the UE whenever HARQ-ACK codebook transmission is required.

When a dynamic HARQ-ACK codebook is used, the base station may signal information necessary for generating the HARQ-ACK codebook through the PDCCH. Specifically, the base station may signal information necessary for HARQ-ACK codebook generation through a downlink assignment index (DAI) of the DCI of the PDCCH. In a specific embodiment, the DAI indicates information on the number of bits of the HARQ-ACK codebook included in the HARQ-ACK codebook and information on which channel or signal reception is successful in each bit of the HARQ-ACK codebook. The UE may receive the DAI through the PDCCH scheduling the PDSCH. DAI may be divided into counter-DAI and total-DAI. Total-DAI represents the number of channels or signals for which reception success is indicated through the same HARQ-ACK codebook. The counter-DAI indicates the HARQ-ACK codebook bit indicating whether the reception is successful or the channel indicating whether the reception is successful or not is indicated through the same HARQ-ACK codebook. The DCI scheduling the PDSCH may include a counter-DAI value corresponding to the scheduled PDSCH. hi addition, the DCI scheduling the PDSCH may include a total-DAI value corresponding to the scheduled PDSCH. The UE may determine the number of bits of the dynamic HARQ-ACK codebook, based on information signaled by the PDCCH. Specifically, the UE may determine the number of bits of the dynamic HARQ-ACK codebook, based on the DAI of the DCI of the PDCCH.

Figure 12A:
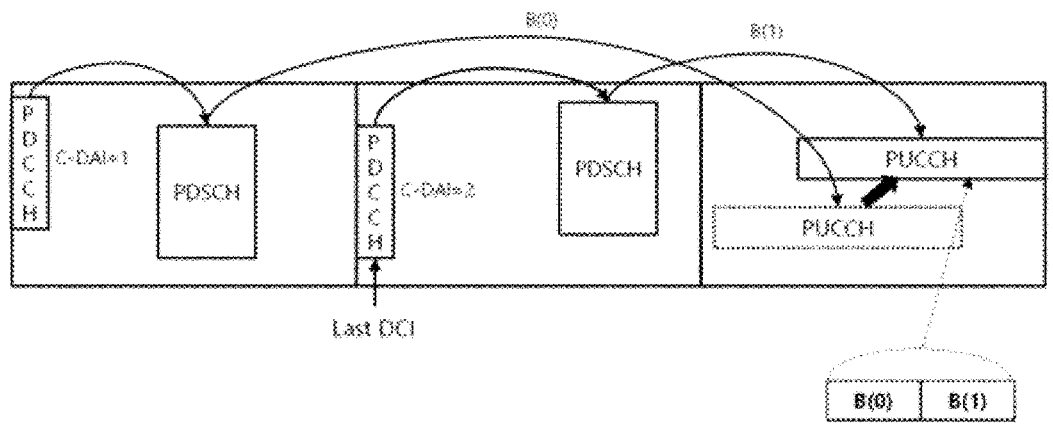
FIGS. 12A and 12B illustrate that a UE generates a dynamic HARQ-ACK codebook and transmits the same to a base station according to an embodiment of the present disclosure.
Figure 12B:
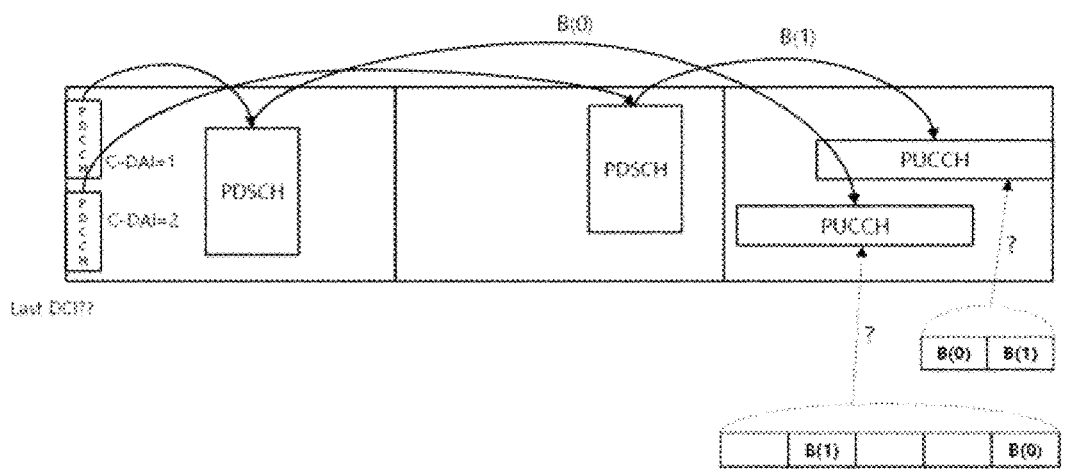

FIGS. 12A and 12B illustrate that a UE generates a dynamic HARQ-ACK codebook and transmits it to a base station according to an embodiment of the present disclosure.

When the UE receives one or more PDCCHs for scheduling a channel and a signal indicating success or failure of reception with a specific HARQ-ACK codebook, the UE may transmit a dynamic HARQ-ACK codebook, based on the last received PDCCH. Specifically, the UE may transmit the PUCCH including the HARQ-ACK codebook in the resource indicated by the PDCCH last received by the UE. The PDCCH last received by the UE represents a PDCCH last received by the UE among PDCCHs for scheduling a signal or channel indicating whether reception is successful or not through the HARQ-ACK codebook. In the present disclosure, unless otherwise specified, a resource represents a combination of a time resource and a frequency resource. Here, the time resource includes an OFDM symbol, and the frequency resource includes a physical resource block (PRB). In addition, for convenience of description, when the UE receives one or more PDCCHs for scheduling a channel and a signal indicating whether reception is successful in the same HARQ-ACK codebook, the last PDCCH received by the UE is referred to as the last PDCCH. In FIGS. 12(*a*) and 12(*b*), the UE receives two PDCCHs, and each of the two PDCCHs schedules a PDSCH. Since the PDCCHs are received in different CORESETs, search spaces, or OFDM symbols in FIG. 12(*a*), the UE can clearly determine which PDCCH is the last PDCCH, and can transmit a PUCCH including a HARQ-ACK codebook in a resource indicated by the corresponding PDCCH. For example, the UE may determine a PDCCH in which the start symbol is later among the two PDCCHs as the last PDCCH. Alternatively, the UE may determine a PDCCH in which the last symbol is later among the two PDCCHs as the last PDCCH. In FIG. 12(*b*), the UE receives a plurality of PDCCHs in one search space or the same OFDM symbol. Therefore, the UE cannot clearly determine which PDCCH is the last PDCCH and cannot determine a resource to transmit a PUCCH including a HARQ-ACK codebook. Therefore, there is a need for a method for the UE to determine the last PDCCH even in this case.

The UE may determine the last PDCCH, based on the symbol on which the PDCCH is received. Specifically, the UE may determine the PDCCH having the latest start symbol of the PDCCH among the plurality of PDCCHs as the last PDCCH. In addition, the UE may determine the PDCCH in which the last symbol of the PDCCH ends last among the plurality of PDCCHs as the last PDCCH. When the UE determines the last PDCCH, based on the symbol on which the PDCCH is received, the UE may not be able to determine the last PDCCH only with the symbol on which the PDCCH is received. For example, one or more symbols for receiving a plurality of PDCCHs may be the same. In the present disclosure, the fact that one or more symbols for receiving a plurality of PDCCHs are the same may include that the start symbols of the plurality of PDCCHs are the same. In addition, the fact that the plurality of PDCCHs are received in the same symbol may include that the last symbol of each of the plurality of PDCCHs is the same. In addition, the fact that one or more symbols for receiving a plurality of PDCCHs are the same may indicate that the start symbols of the plurality of PDCCHs are the same and that the end symbols of the plurality of PDCCHs are the same. When it is not possible to determine the last PDCCH, based on the symbol on which the PDCCH is received, the UE may determine the last PDCCH, based on the cell index of the cell in which the PDCCH is received and the symbol on which the PDCCH is received. When one or more symbols in which a plurality of PDCCHs are received arc the same, the UE may determine a PDCCH having a high cell index of a cell in which the PDCCH is received as a late-order PDCCH. There may be a problem in which a plurality of PDCCHs are received in one cell and in which one or more symbols in which a plurality of PDCCHs are received are the same.

The UE may determine the last PDCCH, based on the symbol at which the PDCCH is received, the cell index of the cell where the PDCCH is received, and the index of a physical resource block (PRB) to which the PDCCH is mapped. The UE may not be able to determine the last PDCCH, based on the symbol for receiving the PDCCH and the cell index of the cell in which the PDCCH is received. Specifically, the PDCCH may be received in the same symbol of the same cell. In this case, the UE may determine the last PDCCH, based on the lowest value among the indexes of the PRBs to which each of the plurality of PDCCHs is mapped. In a specific embodiment, when a plurality of PDCCHs receive a PDCCH in the same symbol of the same cell, the UE may determine the PDCCH having the largest lowest value among the indexes of the PRBs to which each of the plurality of PDCCHs is mapped as the last PDCCH of the plurality of PDCCHs. For example, if the lowest value among the indexes of the PRBs to which the first PDCCH is mapped is 10 and the lowest value among the indexes of the PRB s to which the second PDCCH is mapped is 8, the UE may determine that the first PDCCH is a later order of the PDCCH than the second PDCCH. The PRB index may be a cell common PRB index. In addition, the index of the PRB may be a PRB index in the BWP.

In addition, the UE may determine the last PDCCH, based on the symbol at which the PDCCH is received, the cell index of the cell where the PDCCH is received, and the index of the CORESET to which the PDCCH is mapped. The UE may not be able to determine the last PDCCH, based on the symbol for receiving the PDCCH and the cell index of the cell in which the PDCCH is received. Specifically, a plurality of PDCCHs may be received in one symbol of one cell. In this case, the UE may determine the last PDCCH, based on the index of the CORESET to which the plurality of PDCCHs are mapped. In a specific embodiment, when a plurality of PDCCHs are received in one symbol of one cell, the UE may determine the PDCCH having the largest index of the CORESET to which the PDCCH is mapped among the plurality of PDCCHs as the last PDCCH among the plurality of PDCCHs.

Figure 13:
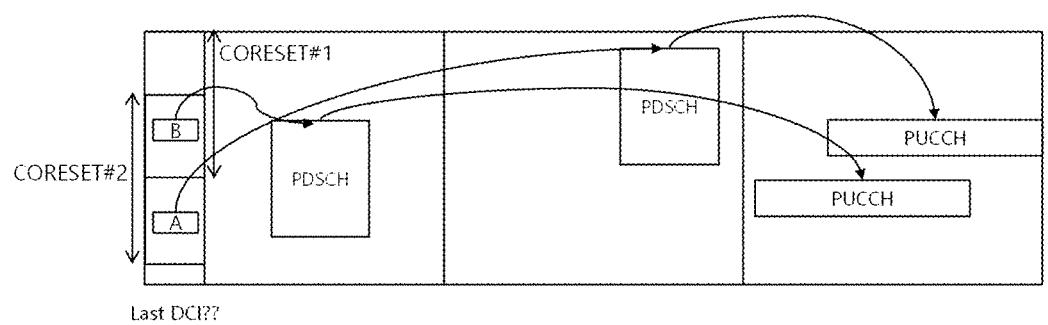
FIG. 13 illustrates a case where one PDCCH is received from a resource mapped by a plurality of CORSETs.

FIG. 13 illustrates a case where one PDCCH is received from a resource mapped by a plurality of CORSETs.

As illustrated in FIG. 13, one PDCCH may be received in a resource mapped to a plurality of CORSETs. In this case, the UE may determine that the corresponding PDCCH is mapped or received from a CORSET having a high index among a plurality of CORSETs. In another specific embodiment, when one PDCCH is received from a resource mapped to a plurality of CORSETs, the UE may determine that the corresponding PDCCH is mapped or received from a COR-SET having a high index among the plurality of CORSETs.

In addition, the UE may determine the last PDCCH, based on the symbol at which the PDCCH is received, the cell index of the cell where the PDCCH is received, the index of the CORESET to which the PDCCH is mapped, and the order of the lowest CCE to which the PDCCH is mapped. The UE may not be able to determine the last PDCCH, based on the symbol for receiving the PDCCH, the cell index of the cell where the PDCCH is received, and the index of the CORESET to which the PDCCH is mapped. Specifically, a plurality of PDCCHs may be received in the same symbol of the same cell, and a plurality of PDCCHs may be mapped to the same CORSET. In this case, the UE may determine the last PDCCH, based on the order of the lowest CCE to which the PDCCH is mapped. In a specific embodiment, when a plurality of PDCCHs are received in the same symbol of the same cell and a plurality of PDCCHs are mapped to the same CORSET, the UE may determine the PDCCH having the largest index of the lowest CCE to which the PDCCH is mapped as the last PDCCH among the plurality of PDCCHs.

In another specific embodiment, the UE may expect that resources for PUCCH transmission indicated by a plurality of PDCCHs received at the same time point are the same. That is, the UE may operate on the premise that the resources for PUCCH transmission indicated by a plurality of PDCCHs received at the same time point are the same. The UE may consider that resources for PUCCH transmission indicated by a plurality of PDCCHs received at the same time point are the same. In this embodiment, when a PDCCH is received at a plurality of time points, the UE does not need to determine which of the plurality of PDCCHs is the last PDCCH. In addition, when a plurality of PDCCHs received at the same time point to different PUCCH resources, the UE may determine that the plurality of PDCCHs are not valid. In addition, when the base station transmits a plurality of PDCCHs at the same time, the base station cannot set the DCI field of the PDCCH so that the plurality of PDCCHs indicate different PUCCH resources. The plurality of PDCCHs received at the same time may include one or more of the same symbols for receiving the plurality of PDCCHs. As described above, the fact that one or more symbols for receiving a plurality of PDCCHs are the same may include that the start symbols of the plurality of PDCCHs are the same. In addition, when one or more symbols for receiving a plurality of PDCCHs are the same, it may indicate that the start symbols of the plurality of PDCCHs arc the same and that the end symbols of the plurality of PDCCHs are the same. In addition, when one or more symbols for receiving a plurality of PDCCHs are the same, it may indicate that the start symbols of the plurality of PDCCHs are the same and that the end symbols of the plurality of PDCCHs are the same.

In addition, a method of arranging HARQ-ACK information bits according to the order of the counter-DAI field in the dynamic HARQ-ACK codebook will be described. When the UE aligns the HARQ-ACK information bits according to the counter-DAI field in the dynamic HARQ-ACK codebook, the UE may apply embodiments similar to the method of determining the last PDCCH for determining the PUCCH resource in which the dynamic HARQ-ACK codebook is transmitted. The UE may determine the sorting order of the HARQ-ACK information bits corresponding to the counter-DAI field of each PDCCH in the dynamic HARQ-ACK codebook according to the cell index of the PDCCH and the index of the symbol in which the PDCCH is received. In FIG. 12(a), in the dynamic HARQ-ACK codebook, the HARQ-ACK information bit corresponding to the counter-DAI (C-DAT) value of the PDCCH preceding in time may be arranged at a position preceding the HARQ-ACK information bit corresponding to the counter-DAI (C-DAI) value of the PDCCH following in time. Specifically, when the symbols for receiving a plurality of PDCCHs are the same, the UE may first arrange the HARQ-ACK information bit corresponding to the counter-DAI field of the PDCCH corresponding to the index of the relatively low cell in the dynamic HARQ-ACK codebook, and then arrange the HARQ-ACK information bit corresponding to a counter-DAI field corresponding to a relatively high cell index. When the symbols for receiving a plurality of PDCCHs are the same and all of the plurality of PDCCHs correspond to a specific cell, there is a need for a method of aligning hits indicating HARQ-ACK corresponding to a counter-DAI field of each of a plurality of PDCCHs in a dynamic HARQ-ACK codebook. In FIG. 12(b), since the two PDCCHs in the dynamic HARQ-ACK codebook are received by the same symbol, it should be determined whether the HARQ-ACK information bit corresponding to the value of one counter-DAI (C-DAI) should be arranged prior to the HARQ-ACK information bit corresponding to the value of another counter-DAI (C-DAI).

When the UE is unable to sort the HARQ-ACK information bits according to the counter-DAI field, based on the symbol at which each of the plurality of PDCCHs is received and the cell index corresponding to each of the plurality of PDCCHs, the UE may arrange the HARQ-ACK information bits corresponding to the counter-DAI field of each of the plurality of PDCCHs in the dynamic HARQ-ACK codebook, based on the PRB to which each of the plurality of PDCCHs is mapped. In a specific embodiment, when the UE is unable to sort the HARQ-ACK information bits corresponding to the plurality of counter-DAI fields, based on the symbol at which each of the plurality of PDDCHs is received and the cell index corresponding to each of the plurality of PDCCHs, the UE may sort the HARQ-ACK information hits corresponding to the counter-DAT field of each of the plurality of PDCCHs in the dynamic HARQ-ACK codebook, based on the PRB having the lowest index among the PRBs to which each of the plurality of PDCCHs is mapped. For example, when the UE is unable to sort the HARQ-ACK information bits corresponding to the counter-DAI field of each of the plurality of PDCCHs, based on the symbol at which the PDDCH is received and the cell index corresponding to the PDCCH, the UE may arrange the HARQ-ACK information bits in the order from the HARQ-ACK information bit corresponding to the counter-DAI field of the PDCCH with the lowest index relatively low among the PRBs to which the PDCCH is mapped to the HARQ-ACK information bit corresponding to the counter-DAI field of the PDCCH with the lowest index relatively high among the PRBs to which the PDCCH is mapped in the dynamic HARQ-ACK codebook. When the lowest index among PRBs mapped to the first PDCCH is 10 and the lowest index among PRBs mapped to the second PDCCH is 8, the UE arranges the HARQ-ACK information bit corresponding to the counter-DAT field of the second PDCCH prior to the HARQ-ACK information bit corresponding to the counter-DAI field of the first PDCCH. A case the UE is unable to align the HARQ-ACK information bits corresponding to the counter-DAI field of each of the plurality of PDCCHs, based on the symbol at which each of the plurality of PDDCHs is received and the cell index corresponding to each of the plurality of PDCCHs may include a case in which a plurality of PDCCHs are received in one symbol and all of the plurality of PDCCHs correspond to a specific cell index.

When the UE is unable to sort the HARQ-ACK information bits corresponding to the counter-DAI field of each of the plurality of PDCCHs, based on the symbol at which each of the plurality of PDDCHs is received and the cell index corresponding to each of the plurality of PDCCHs, the UE may sort the HARQ-ACK information bits corresponding to the counter-DAI field of each of the plurality of PDCCHs in the dynamic HARQ-ACK codebook, based on the index of the CORESET to which each of the plurality of PDCCHs is mapped. In a specific embodiment, when the UE is unable to sort the HARQ-ACK information bits corresponding to the counter-DAI field of each of the plurality of PDCCHs, based on the symbol at which each of the plurality of PDDCHs is received and the cell index corresponding to each of the plurality of PDCCHs, the UE may sort the HARQ-ACK information bits corresponding to the counter-DAI field of each of the plurality of PDCCHs in the dynamic HARQ-ACK codebook, based on the index of the CORESET to which each of the plurality of PDCCHs is mapped. For example, when the UE is unable to sort the HARQ-ACK information bits corresponding to the counter-DAI field of each of the plurality of PDCCHs, based on the symbol for receiving the PDDCH and the cell index corresponding to the PDCCH, in the dynamic HARQ-ACK codebook, the UE may arrange the HARQ-ACK information bits in the order of the HARQ-ACK information bit corresponding to the counter-DAI field of the PDCCH with a relatively low index of the CORESET to which the PDCCH is mapped to the HARQ-ACK information bit corresponding to the counter-DAI field of the PDCCH with a relatively high index of the CORESET to which the PDCCH is mapped. As described above, when the UE is unable to sort the HARQ-ACK information bits corresponding to the counter-DAI field of each of the plurality of PDCCHs, based on the symbol at which each of the plurality of PDDCHs is received and the cell index corresponding to each of the plurality of PDCCHs, a case in which a plurality of PDCCHs are received in one symbol and all of the plurality of PDCCHs correspond to a specific cell index may be included. The UE may not be able to sort the HARQ-ACK information bits corresponding to the counter-DAI field of each PDCCH, based on a symbol at which each of the plurality of PDDCHs is received, a cell index corresponding to each of the plurality of PDCCHs, and an index of a CORESET mapped to each of the plurality of PDCCHs. In this case, the UE may sort the HARQ-ACK information bits corresponding to the counter-DAI field of each of the plurality of PDCCHs in the dynamic HARQ-ACK codebook, based on the order of the control channel element (CCE) to which each of the plurality of PDCCHs is mapped. One PDCCH may be received in resources mapped to a plurality of CORSETs. In this case, the UE may determine that the corresponding PDCCH is mapped or received from a CORSET having a high index among a plurality of CORSETs. In another specific embodiment, when one PDCCH is received from a resource mapped to a plurality of CORSETs, the UE may determine that the corresponding PDCCH is mapped or received from a CORSET having a high index among the plurality of CORSETs.

When the UE is unable to sort the HARQ-ACK information bits corresponding to the counter-DAI field of each of the plurality of PDCCHs, based on the symbol at which each of the plurality of PDDCHs is received and the cell index corresponding to each of the plurality of PDCCHs, the UE may sort the HARQ-ACK information bits corresponding to the counter-DAI field of each of the plurality of PDCCHs in the dynamic HARQ-ACK codebook, based on the value of the counter-DAI field of each of the plurality of PDCCHs. In a specific embodiment, when the UE is unable to sort the HARQ-ACK information bits corresponding to the counter-DAI field, based on the symbol at which each of the plurality of PDCCHs is received and the cell index corresponding to each of the plurality of PDCCHs, the UE may sort the HARQ-ACK information bits corresponding to the counter-DAI field of each of the plurality of PDCCHs in the dynamic HARQ-ACK codebook, based on the value of the counter-DAI field of each of the plurality of PDCCHs. For example, when the UE is unable to sort the HARQ-ACK information bits corresponding to the counter-DAI field, based on the symbol at which the PDDCH is received and the cell index corresponding to the PDCCH, in the dynamic HARQ-ACK codebook, the UE may sort the HARQ-ACK information bits in order from the HARQ-ACK information bit in the counter-DAI field of the PDCCH including the counter-DAI field having a relatively low value to the HARQ-ACK information bit corresponding to a counter-DAI field of a PDCCH including a counter-DAI field having a relatively high value. When the value of the counter-DAI field of the first PDCCH is 1 and the value of the counter-DAI field of the second PDCCH is 2, in the dynamic HARQ-ACK codebook, the UE may place the HARQ-ACK information bit corresponding to the counter-DAI of the first PDCCH in front and may place the HARQ-ACK information bit corresponding to the counter-DAI of the second PDCCH relatively to the rear.

The types of scheduling for downlink transmission may be classified into dynamic scheduling and semi-persistent scheduling (SPS). Dynamic scheduling refers to scheduling by DCI. SPS represents scheduling by RRC signaling. When the SPS PDSCH is configured to the UE, the base station may release the SPS PDSCH reception configuration by transmitting the SPS PDSCH release PDCCH to the UE. At this time, the SPS PDSCH release PDCCH represents a PDCCH indicating SPS PDSCH release. Hereinafter, a method of transmitting the HARQ-ACK for the SPS PDSCH release PDCCH by the UE will be described.

Figure 14:
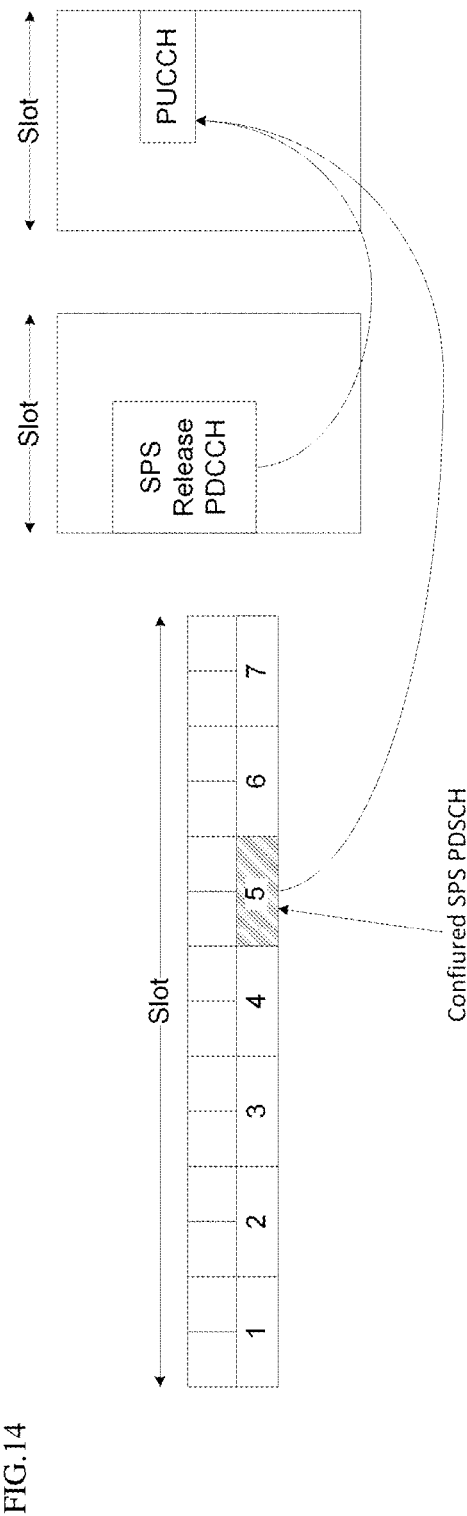
FIG. 14 illustrates a method for a UE to transmit HARQ-ACK for an SPS PDSCH release PDCCH using a semi-static HARQ-ACK codebook according to an embodiment of the present disclosure'

FIG. 14 illustrates a method for a UE to transmit HARQ-ACK for an SPS PDSCH release PDCCH using a semi-static HARQ-ACK codebook according to an embodiment of the present disclosure.

When the SPS PDSCH is configured, the UE may add a 1-bit HARQ-ACK indicating whether reception of the SPS PDSCH release PDCCH is successful to the semi-static HARQ-ACK codebook. In more detail, the UE may add a 1-bit HARQ-ACK for success in reception of the SPS PDSCH release PDCCH to the end of the semi-static HARQ-ACK codebook. When the SPS PDSCH is not configured, the UE does not need to add a 1-bit HARQ-ACK for whether the reception of the SPS PDSCH release PDCCH is successful to the semi-static HARQ-ACK codebook. In this embodiment, when the SPS PDSCH is configured, uplink control information to be transmitted by the UE increases. Accordingly, the coverage of the uplink control channel is reduced. This embodiment may be equally applied even when a plurality of SPS PDSCHs are configured in the UE. In this case, the UE may add a plurality of bits each corresponding to the HARQ-ACK for the plurality of SPS PDSCH release PDCCHs to the dynamic HARQ-ACK codebook. In this case, each of the plurality of SPS PDSCH release PDCCHs corresponds to the plurality of SPS PDSCHs.

In another specific embodiment, when the SPS PDSCH is configured to the UE, the UE may transmit whether the SPS PDSCH release PDCCH is successfully received instead of whether the SPS PDSCH is successfully received in the semi-static HARQ-ACK codebook. That is, the UE may transmit 1 bit of HARQ-ACK indicating whether the reception of the SPS PDSCH release PDCCH is successful instead of 1 bit of HARQ-ACK indicating whether the reception of the SPS PDSCH is successful in the semi-static HARQ-ACK codebook. In this case, the UE may set the value of the corresponding bit in the HARQ-ACK for the SPS PDSCH in the semi-static HARQ-ACK codebook as the HARQ-ACK for the SPS PDSCH release PDCCH. In FIG. 14, a number indicates the position of a bit indicating whether reception is successful or not in the semi-static HARQ-ACK codebook. In the embodiment of FIG. 14, the UE is configured to receive the SPS PDSCH in the 9th symbol and the 10th symbol of the slot, and the HARQ-ACK for the configured SPS PDSCH is located in the fifth bit in the semi-static HARQ-ACK codebook. After the UE receives the SPS PDSCH but before transmitting the HARQ-ACK for the SPS PDSCH, the UE receives the SPS release PDCCH. The UE inserts a bit indicating the HARQ-ACK for the SPS PDSCH release PDCCH in the fifth bit of the semi-static HARQ-ACK codebook, and transmits the semi-static HARQ-ACK codebook to the base station. According to this embodiment, a time period in which the base station can transmit the SPS PDSCH release PDCCH may be limited. This will be described with reference to FIG. 15.

Figure 15:
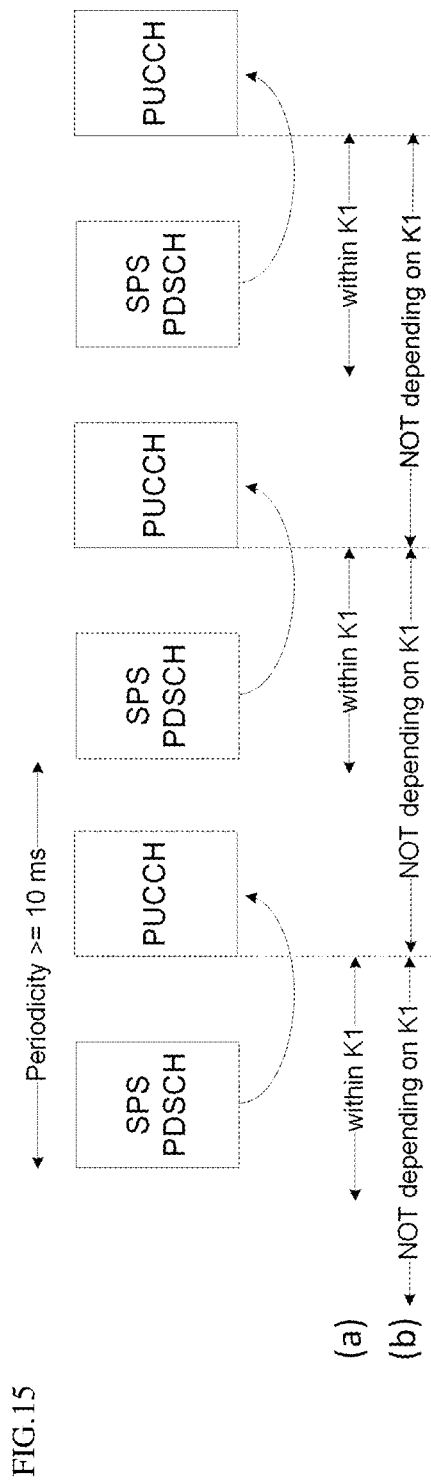
FIG. 15 illustrates a time interval in which a base station can transmit an SPS PDSCH release PDCCH according to an embodiment of the present disclosure.

FIG. 15 illustrates a time interval in which a base station can transmit an SPS PDSCH release PDCCH according to an embodiment of the present disclosure.

In the above-described embodiment, the HARQ-ACK information bit indicating whether the reception of the SPS PDSCH release PDCCH sent by the base station is successful should be the same as the semi-static HARQ-ACK codebook including the HARQ-ACK information bit indicating success in reception of the SPS PDSCH. At this time, the PUCCH indicated by the SPS PDSCH release PDCCH should be the same as the PUCCH transmitting the semi-static HARQ-ACK codebook including the HARQ-ACK information bit indicating whether or not the SPS PDSCH is successfully received. In addition, after receiving the PDSCH, the PUCCH time interval including the HARQ-ACK for the PDSCH is limited to K1 slots, and K1 may be set by an RRC signal. Accordingly, the timing at which the base station can transmit the SPS PDSCH release PDCCH may be limited to a period from the time point when the PUCCH is transmitted to the time point when the PUCCH before K1 slots is transmitted. FIG. 15(a) illustrates a time interval from the time point when the PUCCH is transmitted to the time point when the PUCCH before K1 slots is transmitted.

In another specific embodiment, when the SPS PDSCH is set to the UE and the UE receives the SPS PDSCH release PDCCH, in the semi-static HARQ-ACK codebook including the HARQ-ACK for SPS PDSCH reception set first after receiving the SPS PDSCH release PDCCH, the UE may transmit a bit indicating HARQ-ACK for the SPS PDSCH release PDCCH instead of the hit indicating HARQ-ACK for the SPS PDSCH. At this time, the UE may set the value of the corresponding bit in the HARQ-ACK for the SPS PDSCH in the semi-static HARQ-ACK codebook of the PUCCH including the HARQ-ACK for the SPS PDSCH as HARQ-ACK for the SPS PDSCH release PDCCH. Specifically, when the UE receives the SPS PDSCH release PDCCH in the nth slot and the slot in which the first SPS PDSCH reception set after the nth slot is set is the n+$X^{th}$ slot, the UE may insert a bit indicating HARQ-ACK for the SPS PDSCH release PDCCH in the semi-static HARQ-ACK codebook for SPS PDSCH reception configured in the n+$X^{th}$ slot. In this embodiment, the base station may transmit the SPS PDSCH release PDCCH to the UE without any particular timing limitation. FIG. 15(b) illustrates a time period in which the base station can transmit the SPS PDSCH release PDCCH. However, it may take a long time from when the base station transmits the SPS PDSCH release PDCCH to the time when the UE transmits the HARQ-ACK for the SPS PDSCH release PDCCH.

In another specific embodiment, the UE may determine the semi-static HARQ-ACK codebook and PUCCH resource for transmitting the HARQ-ACK for the SPS PDSCH release PDCCH, based on the time-domain resource assignment (TDRA) field of the SPS PDSCH release PDCCH. Here, the TDRA field is a field indicating information on the time domain allocation information of the PDSCH (i.e., the position of the symbol where the PDSCH starts, the length of the PDSCH) and the position of the DM-RS. The base station can set up to 16 TDRAs to the UE. The UE may receive an indication of one TDRA among the 16 TDRA fields of the PDCCH, and may determine the position of the symbol where the PDSCH starts, the length of the PDSCH, and the position of the DM-RS according to the corresponding TDRA. The SPS PDSCH release PDCCH includes a TDRA field, but since the PDSCH is not scheduled, the TDRA field is not used. Specifically, the UE may determine which bit of the semi-static HARQ-ACK codebook should be inserted into the HARQ-ACK for the SPS PDSCH release PDCCH according to the time domain allocation information of the PDSCH indicated by the TDRA field of the SPS PDSCH release PDCCH. In this case, when the PDSCH is scheduled according to the time domain allocation information of the PDSCH indicated by the TDRA field, whether or not the SPS PDSCH release PDCCH is successfully received may be inserted into a bit indicating whether the PDSCH is successfully received. It is assumed that the UE does not need to receive another channel or signal in a symbol corresponding to the time domain allocation information of the PDSCH indicated by the TDRA field of the SPS PDSCH release PDCCH. In this embodiment, the UE cannot receive the PDSCH in the resource indicated by the TDRA field of the SPS PDSCH release PDCCH.

In this embodiment, the UE may expect that the channel or signal to which the HARQ-ACK should be transmitted through the semi-static HARQ-ACK codebook at the HARQ-ACK time point indicated by the SPS PDSCH release PDCCH in the resource indicated by the TDRA field of the SPS PDSCH release PDCCH is not scheduled. That is, the UE may operate on the premise that the channel or signal to which the HARQ-ACK should be transmitted through the semi-static HARQ-ACK codebook at the HARQ-ACK time point in the resource indicated by the TDRA field of the SPS PDSCH release PDCCH is not scheduled. At this time, the HARQ-ACK time point indicated by the SPS PDSCH release PDCCH is the time point indicated by the PDSCH-to-HARQ_feedback timing indicator field. Specifically, the UE may not expect to receive a channel or signal to which HARQ-ACK is to be transmitted through the semi-static HARQ-ACK codebook at the HARQ-ACK time point indicated by the SPS PDSCH release PDCCH in the resource indicated by the TDRA field of the SPS PDSCH release PDCCH. That is, in the resource indicated by the TDRA field of the SPS PDSCH release PDCCH, the UE may operate on the premise that the UE does not receive a channel or signal to which HARQ-ACK is to be transmitted through a semi-static HARQ-ACK codebook at the HARQ-ACK time point indicated by the SPS PDSCH release PDCCH. In the resource indicated by the TDRA field of the SPS PDSCH release PDCCH, when the UE receives a channel or signal to which HARQ-ACK is to be transmitted through a semi-static HARQ-ACK codebook at a time other than the semi-static HARQ-ACK codebook indicated by the SPS PDSCH release PDCCH, the UE can operate normally. Therefore, in the resource indicated by the TDRA field of the SPS PDSCH release PDCCH, the base station may transmit a channel or signal to which HARQ-ACK is to be transmitted through a semi-static HARQ-ACK codebook at a time other than the semi-static HARQ-ACK codebook indicated by the SPS PDSCH release PDCCH.

In another specific embodiment, the UE may expect that the channel or signal is not scheduled for the resource indicated by the TDRA field of the SPS PDSCH release PDCCH. That is, the UE may operate on the premise that a channel or signal is not scheduled for a resource indicated by the TDRA field of the SPS PDSCH release PDCCH. Specifically, the UE may not expect to receive a channel or signal from a resource indicated by the TDRA field of the SPS PDSCH release PDCCH. That is, the UE may operate on the premise that the UE does not receive a channel or signal from a resource indicated by the TDRA field of the SPS PDSCH release PDCCH. The base station cannot schedule a channel or signal to which HARQ-ACK is to be transmitted through the semi-static HARQ-ACK codebook at a time other than the semi-static HARQ-ACK codebook indicated by the SPS PDSCH release PDCCH in the resource indicated by the TDRA field of the PDCCH.

The UE may be defined as having to transmit the HARQ-ACK of the PDSCH or SPS PDSCH release PDCCH in a slot corresponding to the HARQ-ACK time point indicated by the PDCCH. The semi-static HARQ-ACK codebook transmitted in a slot other than the slot corresponding to the HARQ-ACK time point indicated by the PDCCH may transmit the HARQ-ACK of the PDSCH or SPS PDSCH release PDCCH as NACK. Assuming that the SPS PDSCH release PDCCH indicates the $n^{th}$ slot as the HARQ-ACK time point, the PDSCH transmitted in the resource region overlapping the resource indicated by the TDRA field of the SPS PDSCH release PDCCH indicates the $m^{th}$ slot as the HARQ-ACK time point. At this time, in the $n^{th}$ slot, the UE should transmit HARQ-ACK for the SPS PDSCH release PDCCH, and in the $m^{th}$ slot, the UE should transmit the HARQ-ACK for the PDSCH transmitted in the resource region overlapping the resource indicated by the TDRA field of the SPS PDSCH release PDCCH. Therefore, in a slot other than the slot corresponding to the HARQ-ACK time point indicated by the PDCCH, the UE cannot apply the principle that the HARQ-ACK of the PDSCH or SPS PDSCH release PDCCH should be transmitted as NACK. Accordingly, first, the UE may be defined as transmitting the HARQ-ACK of the SPS PDSCH release PDCCH in a slot corresponding to the HARQ-ACK time point indicated by the SPS PDSCH release PDCCH. When there is a separate HARQ-ACK to be transmitted at the same location as the location of the HARQ-ACK for the SPS PDSCH release PDCCH of the HARQ-ACK codebook transmitted in the corresponding slot, a separate HARQ-ACK is transmitted, in other cases, in a slot other than the slot corresponding to the HARQ-ACK time point indicated by the SPS PDSCH release PDCCH, it may be specified that the UE transmits the HARQ-ACK of the SPS PDSCH release PDCCH as NACK. In the above-described example, in the $m^{th}$ slot, the UE transmits a HARQ-ACK for a PDSCH transmitted in a resource region overlapping with a resource indicated by the TDRA field of the SPS PDSCH release PDCCH.

The base station may configure the UE to receive a plurality of SPS PDSCHs to support a plurality of service types. When a plurality of SPS PDSCH receptions are configured, an SPS PDSCH index may be configured for each SPS PDSCH reception configuration in order to distinguish between different SPS PDSCHs. That is, the UE can distinguish different SPS PDSCH reception configurations through the SPS PDSCH index. The base station may activate the reception of the configured SPS PDSCH by transmitting the SPS PDSCH activation PDCCH. The SPS PDSCH activation PDCCH may be scrambled with CS-RNTI. In addition, the base station may release the SPS PDSCH set to the UE by transmitting the SPS PDSCH release PDCCH. The SPS PDSCH release PDCCH may be scrambled with CS-RNTI. The base station may indicate the SPS PDSCH index in the SPS PDSCH activation PDCCH and the SPS PDSCH release PDCCH. The UE may determine which SPS PDSCH should be activated or released among the plurality of SPS PDSCHs according to the instruction of the base station. Specifically, when the UE receives the SPS PDSCH activation PDCCH, the UE may obtain the index of the SPS PDSCH from the SPS PDSCH activation PDCCH, and the UE may activate the reception of the SPS PDSCH corresponding to the index indicated by the SPS PDSCH activation PDCCH. When the UE receives the SPS PDSCH release PDCCH, the UE may obtain the index of the SPS PDSCH from the SPS PDSCH release PDCCH, and the UE may release the SPS PDSCH reception configuration corresponding to the index indicated by the SPS PDSCH release PDCCH. In order to manage a plurality of SPS PDSCH reception configurations, the base station may group one or a plurality of SPS PDSCH reception configurations into one group. In each SPS PDSCH reception configuration, an SPS PDSCH group index may be configured to distinguish a group including a corresponding SPS PDSCH reception configuration. In each of the plurality of SPS PDSCH reception configurations grouped into one group, an index of the same SPS PDSCH group is set. When the base station intends to release all SPS PDSCH receptions included in the SPS PDSCH group, the base station may indicate the index of the SPS PDSCH group in the SPS PDSCH release PDCCH. When the UE is configured to receive a plurality of SPS PDSCHs, a method of the base station releasing SPS PDSCH reception and a method of transmitting a HARQ-ACK for a PDCCH for releasing a plurality of SPS PDSCHs may be problematic.

The index of the SPS PDSCH group may be indicated with a maximum of 4 bits. The base station may insert the index of the SPS PDSCH group in the HARQ process number field of the SPS PDSCH release PDCCH. The UE may obtain the index of the SPS PDSCH group from the HARQ process number field of the SPS PDSCH release PDCCH, and determine that reception of the SPS PDSCH corresponding to the obtained SPS PDSCH group index has been released. In this case, the UE may not receive the released SPS PDSCH. The HARQ process number field should be able to indicate the maximum value of the index of the SPS PDSCH group. Therefore, the size of the HARQ process number field may be determined through the following embodiments. The number of bits in the HARQ process number field may be equal to ceil(log2(max{# of HARQ process, # of group index for SPS PDSCH})). In this case, # of HARQ process is the number of HARQ processes configured for the UE, and # of group index for SPS PDSCH is the number of indexes of the SPS PDSCH group configured for the UE. In another specific embodiment, when the number of bits in the HARQ process number field is smaller than ceil(log2(# of group index)), in addition to the HARQ process number field, as many bits of other fields of the DCI as the number of bits corresponding to the difference in length between ceil(log2(# of group index)) and the HARQ process number field may be used to indicate the index of the SPS PDSCH group. In this case, the other field may be at least one of a frequency domain resource allocation (FDRA) field, a TDRA field, a modulation and coding scheme (MCS) field, and a redundancy version (RV) field.

When the UE receives the SPS PDSCH release PDCCH that simultaneously releases a plurality of SPS PDSCH reception configurations, the UE may insert a bit indicating HARQ-ACK for the SPS PDSCH release PDCCH to the location of HARQ-ACK for the corresponding SPS PDSCH in the semi-static HARQ-ACK codebook in which the SPS PDSCH release HARQ-ACK for one of a plurality of SPS PDSCH reception configurations released by the PDCCH is included. For example, it is assumed that the UE receives the SPS PDSCH release PDCCH for simultaneously releasing the first SPS PDSCH and the second SPS PDSCH. The HARQ-ACK for the first SPS PDSCH is transmitted to the $x^{th}$ bit in the semi-static HARQ-ACK codebook, and the HARQ-ACK for the second SPS PDSCH is transmitted to the $y^{th}$ bit in the semi-static HARQ-ACK codebook. The UE may insert a bit indicating HARQ-ACK for the SPS PDSCH release PDCCH instead of the bit indicating HARQ-ACK for the first SPS PDSCH in the $x^{th}$ bit of the semi-static HARQ-ACK codehook. Alternatively, the UE may insert a hit indicating HARQ-ACK for the SPS PDSCH release PDCCH instead of the bit indicating HARQ-ACK for the second SPS PDSCH in the $y^{th}$ bit of the semi-static HARQ-ACK codebook. In these embodiments, the UE may select the SPS PDSCH corresponding to the HARQ-ACK position in which the HARQ-ACK for the SPS PDSCH release PDCCH is inserted based on the time resources allocated to each of the plurality of SPS PDSCH reception configurations. The UE may select the SPS PDSCH corresponding to the HARQ-ACK position in which the HARQ-ACK for the SPS PDSCH release PDCCH is to be inserted based on the indexes of the plurality of SPS PDSCH reception configurations. At this time, when the UE receives the SPS PDSCH release PDCCH that simultaneously releases the plurality of SPS PDSCH reception configurations, the UE may transmit a bit indicating the HARQ-ACK for the SPS PDSCH release PDCCH instead of the bit indicating the HARQ-ACK of the SPS PDSCH corresponding to the lowest index among the plurality of SPS PDSCH reception configuration indices.

In another specific embodiment, when the UE receives an SPS PDSCH release PDCCH that simultaneously releases a plurality of SPS PDSCH reception configurations, the UE may insert a hit indicating HARQ-ACK for the SPS PDSCH release PDCCH to the location of bits indicating HARQ-ACK for the corresponding SPS PDSCH of a plurality of semi-static HARQ-ACK codebooks in which a bit indicating HARQ-ACK for each of the plurality of SPS PDSCH reception configurations released by the SPS PDSCH release PDCCH is included. For example, it is assumed that the UE receives the SPS PDSCH release PDCCH for simultaneously releasing the first SPS PDSCH and the second SPS PDSCH. The HARQ-ACK for the first SPS PDSCH is transmitted to the $x^{th}$ bit in the semi-static HARQ-ACK codebook, and the HARQ-ACK for the second SPS PDSCH is transmitted to the $y^{th}$ hit in the semi-static HARQ-ACK codebook. The UE inserts a bit indicating HARQ-ACK for the SPS PDSCH release PDCCH instead of the bit indicating HARQ-ACK for the first SPS PDSCH in the $x^{th}$ bit of the semi-static HARQ-ACK codebook, and inserts a bit indicating HARQ-ACK for the SPS PDSCH release PDCCH instead of the bit indicating HARQ-ACK for the second SPS PDSCH in the $y^{th}$ bit of the semi-static HARQ-ACK codebook.

Like the transmission of the SPS PDSCH, there is a configured grant (CG) PUSCH transmission scheduled for uplink transmission through semi-static scheduling. The base station may release the CG PUSCH set to the UE by transmitting the CG PUSCH release PDCCH. The CG PUSCH release PDCCH may be scrambled with CS-RNTI. When the UE receives the CG PUSCH release PDCCH, the UE releases the CG PUSCH corresponding to the index indicated by the CG PUSCH release PUCCH. In order to manage a plurality of CG PUSCHs, the base station may designate a plurality of CG PUSCHs as one group.

The index of the CG PUSCH group may be indicated with a maximum of 4 bits. The base station may insert the index of the CG PDSCH group into the field of the DCI used to indicate the index of the SPS PDSCH group. The base station may insert the index of the CG PUSCH group into the HARQ process number field of the CG PUSCH release PDCCH. The UE may obtain the index of the CG PUSCH group from the HARQ process number field of the field of the CG PUSCH release PDCCH, and determine that the CG PUSCH corresponding to the obtained CG PUSCH group index is released. At this time, the UE may stop transmitting the released CG PUSCH. The HARQ process number field should be able to indicate the maximum value of the index of the CG PDSCH group. Therefore, the size of the HARQ process number field may be determined through the following embodiments. The number of bits in the HARQ process number field may be equal to ceil (log2(max{# of HARQ process, # of group index for CG PUSCH})). In this case, # of HARQ process is the number of HARQ processes configured in the UE, and # of group index for CG PUSCH is the number of indexes of CG PUSCH groups configured in the UE. In another specific embodiment, when the number of bits in the HARQ process number field is less than ceil (log2 (# of group index)), in addition to the HARQ process number field, as many bits of other fields of the DCI as the number of bits corresponding to the difference in length of ceil (log2 (# of group index)) and the HARQ process number field may be used to indicate the index of the CG PUSCH group. In this case, the other field may be at least one of a frequency domain resource allocation (FDRA) field, a TDRA field, a modulation and coding scheme (MCS) field, and a redundancy version (RV) field. In addition, the number of bits in the HARQ process number field may be ceil(log2 (max{# of HARQ process, # of group index for CG PUSCH, # of group index for SPS PDSCH})). The number of bits in the HARQ process number field may be determined based on a maximum value among the number of HARQ processes, the number of indexes of the CG PUSCH group, and the number of indexes of the SPS PDSCH group.

In the above-described embodiments, when the SPS PDSCH is configured, a method for transmitting the HARQ-ACK for the SPS PDSCH release PDCCH by the UE using a semi-static HARQ-ACK codebook has been described. Hereinafter, a method of transmitting the HARQ-ACK for the SPS PDSCH release PDCCH by the UE using the dynamic HARQ-ACK codebook will be described.

As described above, the UE may determine the size of the dynamic HARQ-ACK codebook and the location of the HARQ-ACK for a specific signal or channel in the dynamic HARQ-ACK codebook using counter-DAI and total-DAI of the PDCCH scheduling the PDSCH. When the SPS PDSCH is activated through the SPS PDSCH activation PDCCH, there is no DCI scheduling the SPS PDSCH. Therefore, the UE cannot determine the size of the dynamic HARQ-ACK codebook and the location of the HARQ-ACK in the dynamic HARQ-ACK codebook using the counter-DAI and total-DAI of the PDCCH. Therefore, when the SPS PDSCH is configured, the UE may add a 1-bit HARQ-ACK indicating whether the SPS PDSCH is successfully received in the dynamic HARQ-ACK codebook. Specifically, the UE may add 1 bit indicating HARQ-ACK for whether the SPS PDSCH is successfully received at the end of the dynamic HARQ-ACK codebook. When the SPS PDSCH is not configured, the UE does not need to add a 1-bit HARQ-ACK for success in reception of the SPS PDSCH to the dynamic HARQ-ACK codebook. In this embodiment, when the SPS PDSCH is configured, uplink control information to be transmitted by the UE increases. Accordingly, the coverage of the uplink control channel (PUCCH) is reduced. This embodiment may be equally applied even when a plurality of SPS PDSCHs are configured in the UE. Therefore, it is necessary to define a location in which HARQ-ACK for each of a plurality of SPS PDSCHs is inserted into the HARQ-ACK codebook.

The location of the HARQ-ACK for each of the plurality of SPS PDSCHs in the dynamic HARQ-ACK codebook may be determined based on the time resource in which each of the plurality of SPS PDSCHs is received. Specifically, the UE may insert a time resource in which each of the plurality of SPS PDSCHs is received in the dynamic HARQ-ACK codebook, based on the received time resource. The UE may determine a location between HARQ-ACKs for each of the plurality of SPS PDSCHs having the same index, based on the time resource in which each of the plurality of SPS PDSCHs is received. In a specific embodiment, when the UE determines the location of the HARQ-ACK information bit of the SPS PDSCH in the dynamic HARQ-ACK codebook, the UE may insert the HARQ-ACK for the SPS PDSCH received relatively earlier than the HARQ-ACK for the SPS PDSCH received relatively later in front of the dynamic HARQ-ACK codebook. In another specific embodiment, the UE may insert a HARQ-ACK for the SPS PDSCH received relatively later in front of the HARQ-ACK for the SPS PDSCH received relatively earlier. In this case, the UE may determine that the SPS PDSCH preceded by the start symbol among the plurality of SPS PDSCHs has been received first. In addition, when the start symbols of the plurality of PDSCHs are the same, the UE may determine that the SPS PDSCH of which the last symbol precedes among the plurality of SPS PDSCHs having the same start symbol has been received first. When the location of the start symbol of the plurality of SPS PDSCHs is the same and the location of the last symbol is also the same, the UE may determine the location between HARQ-ACKs for each of the plurality of SPS PDSCHs, based on the frequency domain resource allocation of each of the plurality of SPS PDSCHs. Specifically, the UE may determine a location between HARQ-ACKs for each of the plurality of SPS PDSCHs, based on the lowest PRB of each of the plurality of SPS PDSCHs. When the location of the start symbol of the plurality of SPS PDSCHs is the same and the location of the last symbol is also the same, the UE may determine a position between HARQ-ACKs for each of the plurality of SPS PDSCHs in the dynamic HARQ-ACK codebook, based on the HARQ-ACK process number of each of the plurality of SPS PDSCHs.

Figure 16:
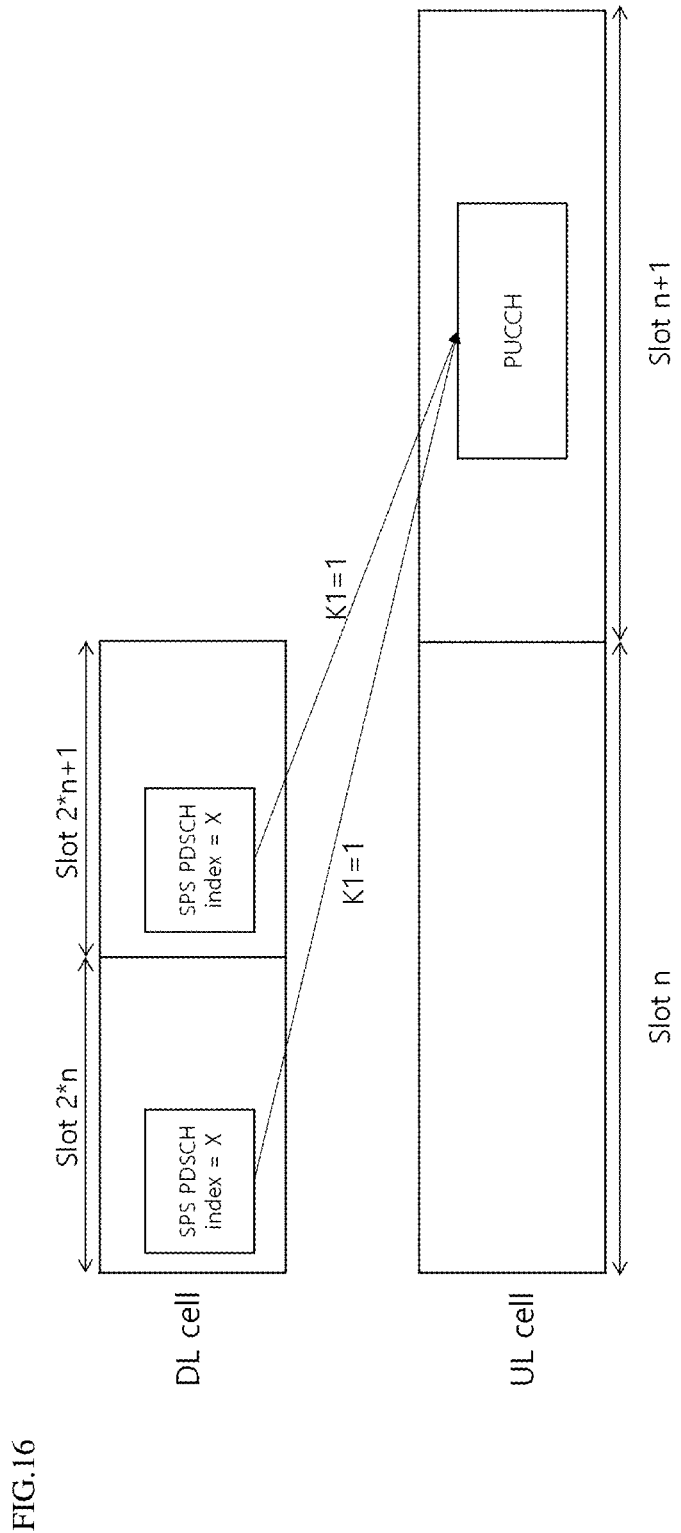
FIG. 16 illustrates a case where a plurality of bits indicating HARQ-ACK for each of a plurality of SPS PDSCHs having the same index are included in the dynamic HARQ-ACK codebook together according to an embodiment of the present disclosure.

FIG. 16 illustrates a case where a plurality of bits indicating HARQ-ACK for each of a plurality of SPS PDSCHs having the same index are included in the dynamic HARQ-ACK codebook together according to an embodiment of the present disclosure.

In the dynamic HARQ-ACK codebook, the location of the HARQ-ACK with respect to whether the reception of each of the plurality of SPS PDSCHs is successful may be determined based on the index of each of the plurality of SPS PDSCHs. Specifically, the UE may insert HARQ-ACK for each of the plurality of SPS PDSCHs into the dynamic HARQ-ACK codebook in ascending order of the indexes of each of the plurality of SPS PDSCHs. When determining the position of a bit in the dynamic HARQ-ACK codebook, the UE may place an SPS PDSCH having a relatively low index among a plurality of SPS PDSCHs in front of the SPS PDSCH having a relatively high index. In another specific embodiment, the UE may insert HARQ-ACKs for each of the plurality of SPS PDSCHs into the dynamic HARQ-ACK codebook in descending order of the indexes of each of the plurality of SPS PDSCHs. When determining the position of a bit in the dynamic HARQ-ACK codebook, the UE may insert an SPS PDSCH having a relatively high index among a plurality of SPS PDSCHs in front of the SPS PDSCH having a relatively low index. However, in this embodiment, there may be a problem when a plurality of SPS PDSCHs in which HARQ-ACK is transmitted by one HARQ-ACK codebook have the same index. Specifically, reception of a plurality of SPS PDSCHs configured by the same SPS PDSCH activation PDCCH may be problematic. For example, assume that a subcarrier spacing of a DL cell is 30 KHz and a subcarrier spacing of a UL cell is 15 KHz. In the embodiment of FIG. 16, the SPS PDSCH having a period of 1 slot is configured in a DL cell, and K1=1 is indicated as a HARQ-ACK time point indicating the number of slots between the SPS PDSCH and the PUCCH through which HARQ-ACK is transmitted. When the SPS PDSCH configured in each of the $2n^{th}$ slot and the $2n+1^{th}$ slot of the DL cell is received, the UE transmits HARQ-ACK on whether the reception of the SPS PDSCH configured in each of the $2n^{th}$ slot and the $2n+1^{th}$ slot of the DL cell in the n+K1=n+$1^{th}$ slot of the UL cell, and the indexes of the two SPS PDSCHs through which the UE transmits the HARQ-ACK are the same. This is because the two SPS PDSCHs to which the UE transmits the HARQ-ACK are SPS PDSCHs activated with one SPS PDSCH-activation PDCCH. In this case, the UE cannot determine the positions of bits indicating HARQ-ACK for each of the plurality of SPS PDSCHs in the dynamic HARQ-ACK codebook, based only on the index of the SPS PDSCH.

The location of the HARQ-ACK for each of the plurality of SPS PDSCHs in the dynamic HARQ-ACK codebook may be determined based on the index of each of the plurality of SPS PDSCHs and the time resource in which each of the plurality of SPS PDSCHs is received. Specifically, the UE may insert HARQ-ACK for each of the plurality of SPS PDSCHs into the dynamic HARQ-ACK codebook, based on the index of each of the plurality of SPS PDSCHs and the time resource in which each of the plurality of SPS PDSCHs is received. First, the UE may determine the location of the HARQ-ACK for each of the plurality of SPS PDSCHs, based on the index of each of the plurality of SPS PDSCHs. A method of determining the location of the HARQ-ACK for each of the plurality of SPS PDSCHs, based on the indexes of each of the plurality of SPS PDSCHs may be the same as in the above-described embodiments. When the indexes of the plurality of SPS PDSCHs are the same, the UE may determine a location between HARQ-ACKs for each of the plurality of SPS PDSCHs having the same index, based on the time resources in which each of the plurality of SPS PDSCHs is received. In a specific embodiment, when the indexes of the plurality of SPS PDSCHs are the same, the UE may insert the HARQ-ACK for the SPS PDSCH received relatively earlier ahead of the HARQ-ACK for the SPS PDSCH received relatively later in front of the dynamic HARQ-ACK codebook. In another specific embodiment, when the indexes of a plurality of SPS PDSCHs are the same, the UE may insert a HARQ-ACK for the SPS PDSCH received relatively later ahead of the HARQ-ACK for the SPS PDSCH received earlier. In this case, the UE may determine that the SPS PDSCH preceded by the start symbol among the plurality of SPS PDSCHs has been received first. In addition, when the start symbols of the plurality of PDSCHs are the same, the UE may determine that the SPS PDSCH of which the last symbol precedes among the plurality of SPS PDSCHs having the same start symbol has been received first. When the indexes of the plurality of SPS PDSCHs are the same, the position of the start symbol is the same, and the position of the last symbol is also the same, the UE may determine a location between HARQ-ACKs for each of the plurality of SPS PDSCHs, based on the frequency domain resource allocation of each of the plurality of SPS PDSCHs. Specifically, the UE may determine a location between HARQ-ACKs for each of the plurality of SPS PDSCHs, based on the lowest PRB of each of the plurality of SPS PDSCHs. When the indexes of the plurality of SPS PDSCHs are the same, the position of the start symbol is the same, and the position of the last symbol is also the same, the UE may determine a position between HARQ-ACKs for each of the plurality of SPS PDSCHs in the dynamic HARQ-ACK codebook, based on the HARQ-ACK process number of each of the plurality of SPS PDSCHs.

The location of the HARQ-ACK for each of the plurality of SPS PDSCHs in the dynamic HARQ-ACK codebook may be determined based on the HARQ process number of each of the plurality of SPS PDSCHs. Specifically, the UE may insert HARQ-ACK for each of the plurality of SPS PDSCHs into the dynamic HARQ-ACK codebook in ascending order of the HARQ process number of each of the plurality of SPS PDSCHs. The UE may insert the SPS PDSCH having a relatively low HARQ process number among the plurality of SPS PDSCHs in front of the dynamic HARQ-ACK codebook ahead of the SPS PDSCH having a relatively high HARQ process number. In another specific embodiment, the UE may insert HARQ-ACK for each of the plurality of SPS PDSCHs into the dynamic HARQ-ACK codebook in descending order of the HARQ process number of each of the plurality of SPS PDSCHs. The UE may insert the SPS PDSCH having a relatively high HARQ process number among the plurality of SPS PDSCHs in front of the dynamic HARQ-ACK codebook ahead of the SPS PDSCH having a relatively low HARQ process number. When a plurality of different SPS PDSCHs have one HARQ process number, the UE cannot generate HARQ-ACKs for the plurality of SPS PDSCHs. This is because one soft-combiner of the UE is allocated to one HARQ process number. When a plurality of SPS PDSCHs correspond to one HARQ process number, the UE may allocate one bit to a dynamic HARQ-ACK codebook of a plurality of SPS PDSCHs corresponding to one HARQ process number. In another specific embodiment, when a plurality of SPS PDSCHs correspond to one HARQ process number, the UE may determine a position between HARQ-ACKs for each of the plurality of SPS PDSCHs in the dynamic HARQ-ACK codebook, based on the time domain information of the SPS PDSCH. In addition, when a plurality of SPS PDSCHs correspond to one HARQ process number, the UE may determine a position between HARQ-ACKs for each of the plurality of SPS PDSCHs in the dynamic HARQ-ACK codebook, based on the index of the SPS PDSCH.

The HARQ process number may be allocated according to the following equation.

$$\text{HARQ Process number} = [\text{floor}(\text{CURRENT\_slot} \times 10 / (\text{numberOfSlotsPerFrame} \times \text{periodicity}))] \text{ modulo nrofHARQ-Processes}$$

The HARQ Process number indicates the HARQ process number, CURRENT_slot=[(SFN×numberOfSlotsPerFrame)+slot number in the frame], and the periodicity indicates the period of SPS PDSCH reception configuration. nrofHARQ-Process represents the number of HARQ process numbers that can be used by the SPS PDSCH reception configuration. The periodicity and nrofHARQ-Process are set from the upper layer. numberOfSlotsPerFrame represents the number of slots per frame. numberOfSlotsPerFrame is determined according to the subcarrier interval. If the subcarrier interval is 15 kHz, numberOfSlotsPerFrame is 10, if the subcarrier interval is 30 kHz, numberOfSlotsPerFrame is 20, if the subcarrier interval is 60 kHz, numberOfSlotsPerFrame is 40, and if the subcarrier interval is 120 kHz, numberOfSlotsPerFrame is 80. slot number in the frame represents the number of slots in the frame. In addition, SFN represents a system frame number. floor(x) represents the maximum value among integers less than or equal to x. x modulo y represents the remaining value when x is divided by y. When the HARQ process number is allocated according to the above equation, as described above, one HARQ process number may be allocated to different SPS PDSCHs. In another specific embodiment, the base station may allocate the HARQ process number to the SPS PDSCH so that different SPS PDSCHs always correspond to different HARQ process numbers. Specifically, the base station may allocate the HARQ process number according to the following equation.

$$\text{HARQ Process number} = [[\text{floor}(\text{CURRENT\_slot} \times 10 / (\text{numberOfSlotsPerFrame} \times \text{periodicity}))] \text{ modulo nrofHARQ-Processes}] + \text{Offset}$$

By adding the offset to the above-described equation, the base station adjusts the offset to allocate the HARQ process number to the SPS PDSCH so that different SPS PDSCHs always correspond to different HARQ process numbers. Specifically, the HARQ process may be assigned Offset, Offset+1, . . . , Offset+nrofHARQ-Process-1 to the number.

The location of the HARQ-ACK for each of the plurality of SPS PDSCHs in the dynamic HARQ-ACK codebook may be determined based on a cell index corresponding to each of the plurality of SPS PDSCHs. The UE may insert HARQ-ACK for each of the plurality of SPS PDSCHs into the dynamic HARQ-ACK codebook, based on a cell index corresponding to each of the plurality of SPS PDSCHs. Specifically, the UE may insert HARQ-ACK for an SPS PDSCH corresponding to a relatively low cell index among a plurality of dynamic SPS PDSCHs to the front of the dynamic HARQ-ACK codebook, and may insert a HARQ-ACK for an SPS PDSCH corresponding to a relatively high cell index among a plurality of SPS PDSCHs to the back of the dynamic HARQ-ACK codebook.

The dynamic grant (DG) PDSCH is a PDSCH scheduled by dynamic scheduling described above. Specifically, the DG PDSCH is the PDSCH scheduled by PDCCH. When the SPS PDSCH-scheduled resource and the DG PDSCH-scheduled resource overlap, there is a problem in how the UE generates the HARQ-ACK codebook.

Figure 17:
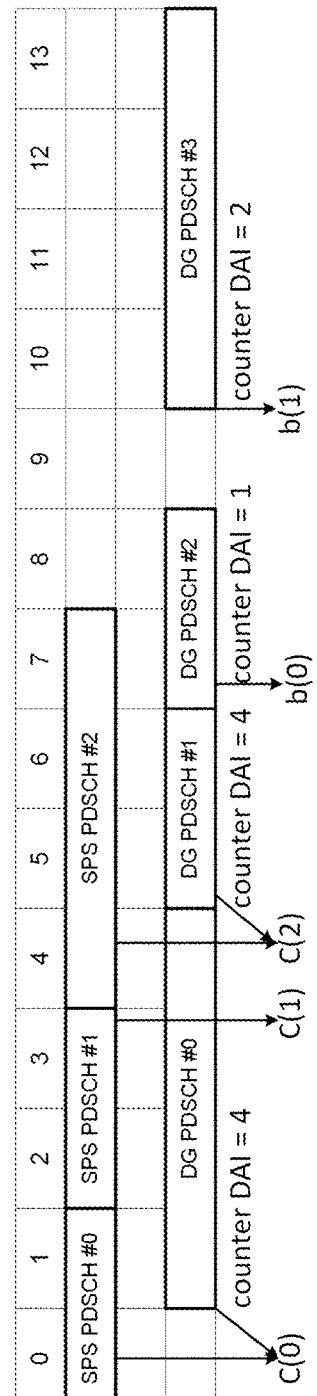
FIG. 17 illustrates a method for a UE to generate a dynamic HARQ-ACK codebook when an SPS PDSCH-scheduled resource and a DG PDSCH-scheduled resource overlap according to an embodiment of the present disclosure.

FIG. 17 illustrates a method for a UE to generate a dynamic HARQ-ACK codebook when an SPS PDSCH-scheduled resource and a DG PDSCH-scheduled resource overlap according to an embodiment of the present disclosure.

The DG PDSCH is a PDSCH scheduled by dynamic scheduling described above. Specifically, the DG PDSCH is the PDSCH scheduled by PDCCH. When the SPS PDSCH-scheduled resource and the DG PDSCH-scheduled resource overlap, the UE may assign a higher priority to the DG PDSCH than to the SPS PDSCH. Specifically, when the resources scheduled for the SPS PDSCH and the resources scheduled for the DG PDSCH overlap, the UE may receive the DG PDSCH without receiving the SPS PDSCH. In a specific embodiment, the UE may receive the PDSCH, based on the PDCCH scheduling the DG PDSCH. In addition, the UE may generate a dynamic HARQ-ACK codebook, based on the counter-DAI and total-DAI of the PDCCH scheduling the DG PDSCH. In this case, the UE may transmit HARQ-ACK for the SPS PDSCH according to the above-described embodiments separately from the dynamic HARQ-ACK codebook generated based on the counter-DAI and the total-DAI of the PDCCH scheduling the DG PDSCH even if the UE does not receive the SPS PDSCH. Therefore, even though it is obvious that the UE does not receive the SPS PDSCH, the UE unnecessarily transmits the HARQ-ACK for the SPS PDSCH to the base station.

When the SPS PDSCH-scheduled resource and the DG PDSCH-scheduled resource overlap, the UE may not generate a separate bit for a bit indicating HARQ-ACK on whether or not the DG PDSCH is successfully received in the dynamic HARQ-ACK codebook, but may insert a bit indicating HARQ-ACK for whether the DO PDSCH is successfully received at the position of the HARQ-ACK information bit of the overlapped SPS PDSCH. In this case, a bit indicating HARQ-ACK on whether or not the overlapped SPS PDSCH is successfully received may not be included in the dynamic codebook. When there are a plurality of SPS PDSCHs overlapping with the time-frequency resource in which the DG PDSCH is scheduled, the UE may select one SPS PDSCH from among a plurality of SPS PDSCHs, and may insert a bit indicating HARQ-ACK for the DG PDSCH at a position of a bit indicating HARQ-ACK of the SPS PDSCH selected from the dynamic HARQ-ACK codebook. In this case, the UE may select one SPS PDSCH from among the plurality of SPS PDSCHs, based on the time frequency resource through which each of the plurality of SPS PDSCHs is transmitted. Specifically, the UE may select the SPS PDSCH that is most advanced in time among the plurality of SPS PDSCHs. In another specific embodiment, the UE may select one SPS PDSCH from among a plurality of SPS PDSCHs, based on the indexes of each of the plurality of SPS PDSCHs. In another specific embodiment, the UE may select one SPS PDSCH from among a plurality of SPS PDSCHs, based on a HARQ process number corresponding to each of the plurality of SPS PDSCHs. When the SPS PDSCH-scheduled resource and the DG PDSCH-scheduled resource do not overlap, the UE may generate a dynamic HARQ-ACK codebook, based on the counter-DAI and total-DAI of the PDCCH scheduling the DG PDSCH to the base station.

When there are a plurality of SPS PDSCHs overlapping with the time-frequency resource in which the DG PDSCH is scheduled, the UE may determine the type of the DG PDSCH and may determine a method of transmitting the HARQ-ACK for the DG PDSCH according to the type. When the DG PDSCH is determined as the first type, the UE may generate a dynamic HARQ-ACK codebook, based on the counter-DAI and total-DAI of the PDCCH scheduling the DG PDSCH. When the DG PDSCH is determined as the second type, the UE may transmit a bit indicating HARQ-ACK for DG PDSCH to the base station instead of a bit indicating HARQ-ACK for SPS PDSCH in the HARQ-ACK codebook scheduled to include HARQ-ACK for one of a plurality of SPS PDSCHs. In this case, a method of determining whether to insert a bit indicating a HARQ-ACK for a DG PDSCH into a HARQ-ACK codebook for any SPS PDSCH among a plurality of SPS PDSCHs may be the same as in the above-described embodiments. Specifically, when the DG PDSCH is of the first type, the UE may generate a first sub-HARQ-ACK codebook, based on the PDCCH scheduling the DG PDSCH. In addition, when the DG PDSCH is of the second type, the UE may generate a second sub-HARQ-ACK codebook in which bits indicating HARQ-ACK for DG PDSCH are inserted instead of bits indicating HARQ-ACK for SPS PDSCH in the HARQ-ACK codebook scheduled to include HARQ-ACK for one of a plurality of SPS PDSCHs. The UE may generate a dynamic HARQ-ACK codebook by combining the first sub-HARQ-ACK codebook and the second sub-HARQ-ACK codebook, and transmit the generated dynamic HARQ-ACK codebook to the base station.

In addition, the UE may determine the type of the DG PDSCH, based on the total-DAT value and the counter-DAI value of the DCI of the PDCCH scheduling the DG PDSCH. Specifically, when the total-DAI of the DCI of the PDCCH scheduling the DG PDSCH is the first value and the counter-DAI value is the second value, the UE may determine the DG PDSCH as the second type. In other cases, the UE may determine the DG PDSCH as the first type. In this case, the first value and the second value may be the same value. For example, both the first value and the second value may be 4. In another embodiment, the UE may determine the type of the DG PDSCH, based on the value of the counter-DAI of the DCI of the PDCCH scheduling the DG PDSCH. Specifically, when the counter-DAI value of the DCT of the PDCCH scheduling the DG PDSCH is the first value, the UE may determine the DG PDSCH as the second type. In other cases, the UE may determine the DG PDSCH as the first type. In this case, the first value may be 4.

In the embodiment of FIG. 17, three SPS PDSCHs are configured. The first SPS PDSCH (SPS PDSCH#0) is allocated to the first symbol 0 and the second symbol 1 of the slot. The second SPS PDSCH (SPS PDSCH#1) is allocated to the third symbol 2 and the fourth symbol 3 of the slot. The third SPS PDSCH (SPS PDSCH#3) is allocated to the fifth symbol 4, the sixth symbol 5, the seventh symbol 6 and the eighth symbol 7 of the slot. The UE receives 4 PDCCHs. The first PDCCH schedules the first DG-PDSCH (DG PDSCH#0) in the second symbol 1, the third symbol 2, the fourth symbol 3, and the fifth symbol 4 of the slot. The second PDCCH schedules a second DG-PDSCH (DG PDSCH#1) in the sixth symbol 5 and the seventh symbol 6 of the slot. The third PDCCH schedules a third DG-PDSCH (DG PDSCH#3) in the eighth symbol 7 and the eleventh symbol 8 of the slot. The fourth PDCCH schedules a fourth DG-PDSCH (DG PDSCH#3) in the eleventh symbol 10, the twelfth symbol 11, the thirteenth symbol 12, and the fourteenth symbol 13 of the slot. The value of the counter-DAI of the first PDCCH is 4, the value of the counter-DAT of the second PDCCH is 4, the value of counter-DAI of the third PDCCH is 1, and the value of counter-DAI of the fourth PDCCH is 2. In the embodiment of FIG. 16, when the value of the counter-DAI of the DCI of the PDCCH is 4, the UE determines the DG PDSCH as the second type. In this case, when the DG-PDSCH is of the second type, the UE may insert a bit indicating the HARQ-ACK for the DG PDSCH in the HARQ-ACK codebook for the SPS PDSCH that is temporally most advanced among the plurality of SPS PDSCHs.

The counter-DAI value of the third PDCCH and the counter-DAI value of the fourth PDCCH are not 4. Therefore, the UE determines the location of the HARQ-ACK for the third DG-PDSCH (DG PDSCH#2) in the first sub-HARQ-ACK codebook, based on the counter-DAI and the total-DAI of the third PDCCH, and inserts a bit indicating the HARQ-ACK for the third DG-PDSCH (DG PDSCH#2) at the position b(0) determined in the first sub-HARQ-ACK codebook. In addition, the UE determines the location of the HARQ-ACK for the fourth DG-PDSCH (DG PDSCH#3) in the first sub-HARQ-ACK codebook, based on the counter-DAI and the total-DAI of the fourth PDCCH, and inserts a bit indicating the HARQ-ACK for the fourth DG-PDSCH (DG PDSCH#3) at the position b(1) determined in the first sub-HARQ-ACK codebook. Since the value of counter-DAI of the first PDCCH is 4, the UE inserts a hit indicating HARQ-ACK for the first DG-PDSCH (DG PDSCH#1) instead of a bit indicating HARQ-ACK for the first SPS PDSCH (SPS PDSCH#0) C(0) in the second sub-HARQ-ACK codebook. Since the value of the Counter-DAI of the second PDCCH is also 4, the UE inserts a bit indicating HARQ-ACK for the second DG-PDSCH (DG PDSCH#1) instead of a bit indicating HARQ-ACK for the second SPS PDSCH (SPS PDSCH#1) C(1) in the second sub-HARQ-ACK codebook. The UE generates a HARQ-ACK codebook by combining the first sub-HARQ-ACK codebook and the second sub-HARQ-ACK codebook, and transmits the generated HARQ-ACK codebook to the base station.

As described above, two or more HARQ-ACKs corresponding to one HARQ process cannot be transmitted in one HARQ-ACK codebook. Therefore, when there is an SPS PDSCH corresponding to the same HARQ process number as the HARQ process number of the DG PDSCH, the UE may insert a bit indicating HARQ-ACK for the DG PDSCH instead of a bit indicating HARQ-ACK for the SPS PDSCH in the HARQ-ACK codebook in which the HARQ-ACK for the SPS PDSCH corresponding to the same HARQ process number as the HARQ process number of the DG PDSCH is to be transmitted.

In the above-described embodiments, the physical data channel may include a PDSCH or a PUSCH. In addition, the physical control channel may include a PDCCH or PUCCH. In addition, in the embodiment described by taking PUSCH, PDCCH, PUCCH, and PDCCH as an example, different types of data channels and control channels may be applied.

Although the method and system of the present disclosure have been described in connection with specific embodiments, some or all of their components or operations may be implemented using a computing system having a general-purpose hardware architecture.

The above description of the present disclosure is for illustrative purposes only, and those of ordinary skill in the art to which the present disclosure pertains will be able to understand that other specific forms can be easily modified without changing the technical spirit or essential features of the present disclosure. Therefore, it should be understood that the embodiments described above are illustrative and non-limiting in all respects. For example, each component described as a single type may be implemented in a distributed manner, and similarly, components described as being distributed may also be implemented in a combined form.

The scope of the present disclosure is indicated by the claims to he described later rather than the detailed description, and all changes or modified forms derived from the meaning and scope of the claims and their equivalent concepts should be construed as being included in the scope of the present disclosure.

The invention claimed is:

1. A device for use in a wireless communication system, the device comprising:
   a memory; and
   a processor connected to the memory and configured to:
   configure receptions of multiple semi-persistent scheduling physical downlink shared channels (SPS PDSCHs); and
   transmit a semi-static hybrid automatic repeat request acknowledgement (HARQ-ACK) codebook including HARQ-ACK bits related to the multiple SPS PDSCHs,
   wherein, based on a physical downlink control channel (PDCCH) indicating a release of the multiple SPS PDSCHs being associated with the semi-static HARQ-ACK codebook, HARQ-ACK information for the PDCCH is located at a bit position for one of the multiple SPS PDSCHs in the semi-static HARQ-ACK codebook, based on indexes related to the multiple SPS PDSCHs.

2. The device of claim 1, wherein a plurality of candidate receptions for the semi-static HARQ-ACK codebook is defined based on a set of PDSCH-to-physical uplink control channel (PUCCH) slot timing values.

3. The device of claim 1, wherein the semi-static HARQ-ACK codebook has a pre-defined size.

4. The device of claim 1, wherein the semi-static HARQ-ACK codebook is transmitted through a physical uplink control channel (PUCCH).

5. A method for use in a wireless communication system, the method comprising:
   configuring receptions of multiple semi-persistent scheduling physical downlink shared channels (SPS PDSCHs); and
   transmitting a semi-static hybrid automatic repeat request acknowledgement (HARQ-ACK) codebook including HARQ-ACK bits related to the multiple SPS PDSCHs,
   wherein, based on a physical downlink control channel (PDCCH) indicating a release of the multiple SPS PDSCHs being associated with the semi-static HARQ-ACK codebook, HARQ-ACK information for the PDCCH is located at a bit position for one of the multiple SPS PDSCHs in the semi-static HARQ-ACK codebook, based on indexes related to the multiple SPS PDSCHs.

6. The method of claim 5, wherein a plurality of candidate receptions for the semi-static HARQ-ACK codebook is defined based on a set of PDSCH-to-physical uplink control channel (PUCCH) slot timing values.

7. The method of claim 5, wherein the semi-static HARQ-ACK codebook has a pre-defined size.

8. The method of claim 5, wherein the semi-static HARQ-ACK codebook is transmitted through a physical uplink control channel (PUCCH).

9. A device for use in a wireless communication system, the device comprising:
   a memory; and
   a processor connected to the memory and configured to:
   configure transmissions of multiple semi-persistent scheduling physical downlink shared channels (SPS PDSCHs); and receive a semi-static hybrid automatic repeat request acknowledgement (HARQ-ACK) codebook including HARQ-ACK bits related to the multiple SPS PDSCHs, wherein, based on a physical downlink control channel (PDCCH) indicating a release of the multiple SPS PDSCHs being associated with the semi-static HARQ-ACK codebook, HARQ-ACK information for the PDCCH is located at a bit position for one of the multiple SPS PDSCHs in the semi-static HARQ-ACK codebook, based on indexes related to the multiple SPS PDSCHs.

10. The device of claim 9, wherein a plurality of candidate transmissions for the semi-static HARQ-ACK codebook is defined based on a set of PDSCH-to-physical uplink control channel (PUCCH) slot timing values.

11. The device of claim 9, wherein the semi-static HARQ-ACK codebook has a pre-defined size.

12. The device of claim 9, wherein the semi-static HARQ-ACK codebook is received through a physical uplink control channel (PUCCH).

13. A method for use in a wireless communication system, the method comprising:

configuring transmissions of multiple semi-persistent scheduling physical downlink shared channels (SPS PDSCHs); and receiving a semi-static hybrid automatic repeat request acknowledgement (HARQ-ACK) codebook including HARQ-ACK bits related to the multiple SPS PDSCHs, wherein, based on a physical downlink control channel (PDCCH) indicating a release of the multiple SPS PDSCHs being associated with the semi-static HARQ-ACK codebook, HARQ-ACK information for the PDCCH is located at a bit position for one of the multiple SPS PDSCHs in the semi-static HARQ-ACK codebook, based on indexes related to the multiple SPS PDSCHs.

14. The method of claim 13, wherein a plurality of candidate transmissions for the semi-static HARQ-ACK codebook is defined based on a set of PDSCH-to-physical uplink control channel (PUCCH) slot timing values.

15. The method of claim 13, wherein the semi-static HARQ-ACK codebook has a pre-defined size.

16. The method of claim 13, wherein the semi-static HARQ-ACK codebook is received through a physical uplink control channel (PUCCH).

* * * * *